United States Patent
Morikawa

(10) Patent No.: US 7,051,107 B2
(45) Date of Patent: May 23, 2006

(54) DISTRIBUTED ENVIRONMENT TYPE COMPUTER SYSTEM ABLE TO ACHIEVE HIGH SPEED CONSECUTIVE MESSAGE COMMUNICATIONS BY SERVICE LAYER

(75) Inventor: Ikuya Morikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 655 days.

(21) Appl. No.: 10/067,710

(22) Filed: Feb. 5, 2002

(65) Prior Publication Data

US 2002/0184374 A1 Dec. 5, 2002

(30) Foreign Application Priority Data

May 31, 2001 (JP) .............................. 2001-165452

(51) Int. Cl.
*G06F 15/16* (2006.01)
*G06F 15/173* (2006.01)

(52) U.S. Cl. ...................................... 709/229; 709/223

(58) Field of Classification Search ................ 709/223, 709/220, 229; 370/395.21, 903; 713/156; 726/1, 3
See application file for complete search history.

(56) References Cited

U.S. PATENT DOCUMENTS

| | | | |
|---|---|---|---|
| 6,047,051 A * | 4/2000 | Ginzboorg et al. | 379/130 |
| 6,654,814 B1 * | 11/2003 | Britton et al. | 709/246 |
| 6,684,244 B1 * | 1/2004 | Goldman et al. | 709/223 |
| 6,799,032 B1 * | 9/2004 | McDonnell et al. | 455/410 |
| 2001/0005883 A1 * | 6/2001 | Wray et al. | 713/151 |
| 2001/0016838 A1 * | 8/2001 | Landrock | 705/80 |
| 2002/0093529 A1 * | 7/2002 | Daoud et al. | 345/745 |
| 2003/0204574 A1 * | 10/2003 | Kupershmidt | 709/220 |

FOREIGN PATENT DOCUMENTS

JP 2000020442 1/2000

OTHER PUBLICATIONS

Morikawa, et al., Security Platform for OSS Interconnection Between Organizations. Institute of Electronics, Information, and Communications Engineers, May 18, 2001, pp. 25-30.
Morikawa, et al., Security Platform for OSS Interconnection. International Conference APNOMS2000 May 26, 2000 pp. 1-12 and Table of Contents.
OMG Security Service Specification. Version 1.7, Dec. 1999 www.omg.org/technology/documents/formal/security-service.htm.

* cited by examiner

*Primary Examiner*—Patrice Winder
*Assistant Examiner*—Michael Delgado
(74) *Attorney, Agent, or Firm*—Katten Muchin Rosenman LLP

(57) ABSTRACT

A distributed environment type computer system enabling a service layer to execute consecutive message communications at a high speed provided with a message transferring unit, a service layer for providing a specific additional service to an application, a policy manager for supplying a policy, a communication layer for transferring messages, an analyzing unit for extracting from a message the parameters describing the message, while dividing the parameters into static parameters and dynamic parameters, and a requesting unit for requesting the policy manager to acquire a group of policies allocated to the static parameters using the static parameters.

20 Claims, 17 Drawing Sheets

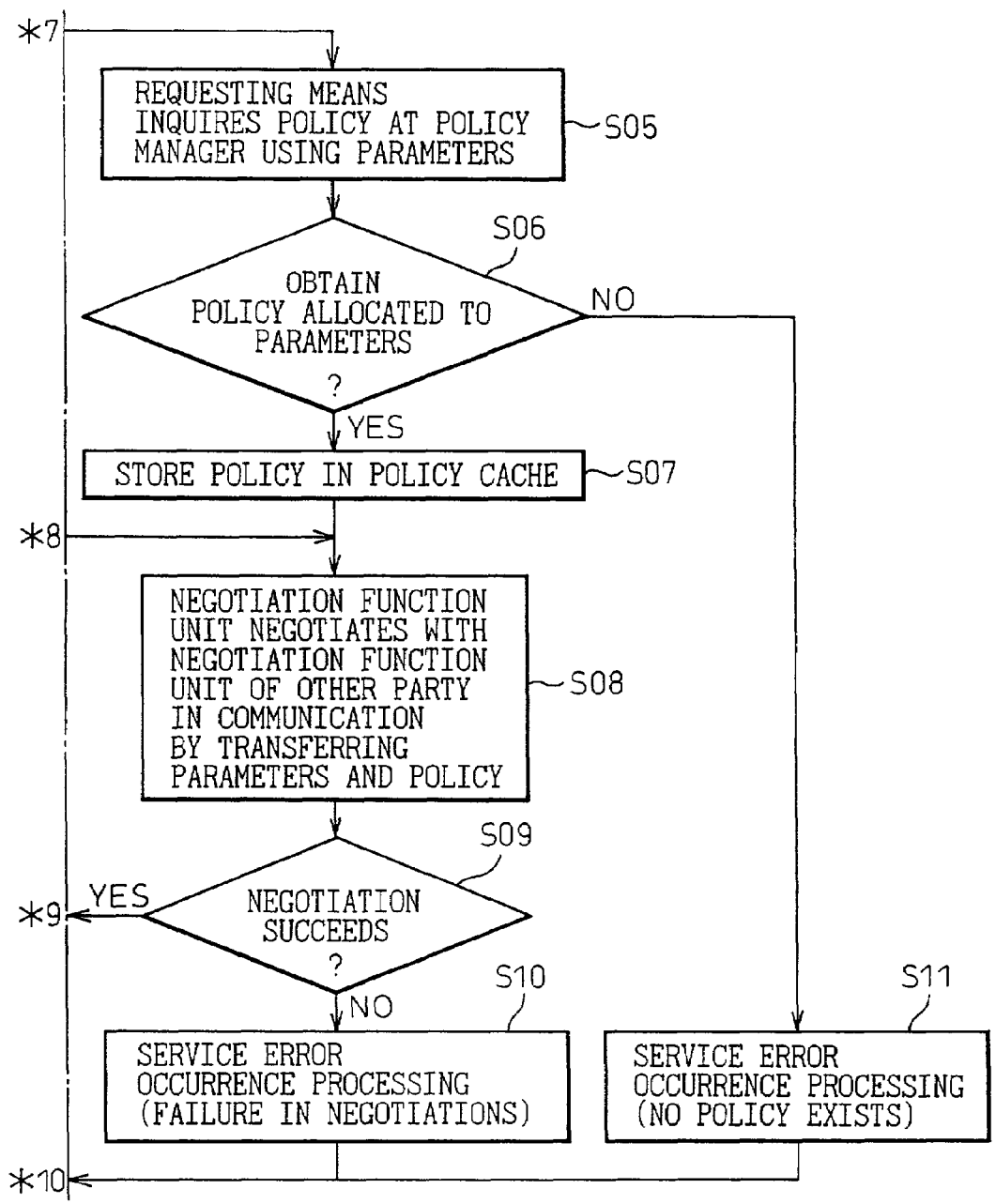

DISTRIBUTED ENVIRONMENT TYPE COMPUTER SYSTEM ABLE TO ACHIEVE HIGH SPEED CONSECUTIVE MESSAGE COMMUNICATIONS BY SERVICE LAYER

BACKGROUND OF THE INVENTION

1. Field of the Invention

The present invention relates to a plurality of computer systems for transferring messages in accordance with application software under a distributed environment, more particularly relates to a service layer built into a computer system and providing additional service in accordance with a certain policy and to a policy manager centrally managing the above policies in cooperation with a service layer.

2. Description of the Related Art

The recent growth of computer networks has led to the extensive transfer of information among a number of distributed computer systems based on application software. This environment is generally called a "distributed environment."

Such a distributed environment is generally realized by separate application software for providing general functions and communication layers for generally providing functions relating to communications. Here, a "communication layer" includes physical communication functions, that is, communication channels or communication networks, communication protocols defining these physical communication functions as communication procedures, operating systems (OS) or application programming interfaces (API) for providing communication protocols to the application software, distributed platform layers (DPL) incorporating advanced communication functions or communication support functions, etc. As a typical example of a DPL, so-called "common object request broker architecture" (CORBA) providing more extensive communication functions than the operating systems may be mentioned.

As will be explained later in detail with reference to the drawings, there are the following four problems in the related art.

In certain types of modes of use of distributed environments, sometimes the applications transfer large numbers of different types of messages in a short time. For example, a remote control application realized using the above CORBA (i) sends a request inquiring about the internal status of another application, (ii) sends a request for processing, (iii) sends a request for inquiry once again, and (iv) sends another request for processing, that is, sometimes a large number of different requests are asked to be made within a short time.

In such a case, with a first system configuration (FIG. 3 and FIG. 4 explained later), each time there is a request, a so-called "cache misshit" occurs where a suitable policy cannot be acquired from a policy cache function unit and excess time ends up being spent for acquiring the policy from the policy manager. In this way, despite the presence of a cache mechanism, there is a first problem that this cache misshit makes efficient operation impossible.

On the other hand, faced with such a cache misshit, a cache in a general computer system, for example, fetches and caches certain corresponding areas in the memory consecutively. Due to this, cache misshits in consecutive memory access are prevented. This is general practice. In the case of the above policy cache, however, often the group of required policies are not consecutive. Therefore, the above general cache could not exhibit its inherent effectiveness. In other words, in the above case, there was the second problem that the policies had to be acquired based on a suitable strategy predicting the required policies.

Further, in a second system configuration (FIG. 14 and FIG. 15 explained later), even if policies were suitably cached, the service layer had to negotiate with the service layer of the other party in the communication for each policy. Therefore, there was the third problem that communication time and processing time were required for the negotiations and excess time ended up being spent.

Further, in the second system configuration, the negotiation over policy between the policy managers was completed in advance and the negotiations between the service layers during the communications were eliminated, but no means have been realized for guaranteeing the reliability of the completion of the advance negotiations. Therefore, the service layers cannot prevent the occurrence of mismatches of policies due to illegitimate actions or human error in settings at the policy managers or mismatches of policies due to errors in transmission of policies arising due to communication errors.

Further, in the above second system configuration, there was the fourth problem that, in the above type of mode of use, excess time is taken in the communication of messages and the reliability of the negotiations over policies performed between two service layers cannot be guaranteed. This was disadvantageous to the user.

SUMMARY OF THE INVENTION

An object of the present invention is to provide a computer system able to greatly reduce the processing which a service layer performs for each message communication for inquiring about a policy to a policy manager or able to eliminate the processing for negotiations relating to application of a policy performed with the service layer of another party and therefore enabling a service layer to execute consecutive message communications at a high speed.

Another object of the present invention is to provide a service layer, policy cache function unit, and policy manager for such a computer system.

To attain the above object, the computer system according to the present invention is configured as follows, that is, is comprised of a message sending/receiving means (10), a service layer (3) for providing a specific additional service to an application (1), a policy manager for supplying a policy, a communication layer for transferring a message, an analyzing means (30) for extracting from a message parameters describing the message divided into static parameters (101) and dynamic parameters (102), and a requesting means (31) for requesting the policy manager (7) to acquire a group of policies allocated to the static parameters. Due to this, a distributed environment type computer system is provided enabling a service layer to execute consecutive message communications at a high speed.

BRIEF DESCRIPTION OF THE DRAWINGS

These and other objects and features of the present invention will become clearer from the following description of the preferred embodiments given with reference to the attached drawings, wherein:

FIG. 17 is a second part of a flow chart showing the flow of processing in a computer system upon which the present invention is predicated shown in FIG. 14 and FIG. 15.

DESCRIPTION OF THE PREFERRED EMBODIMENTS

Before describing the preferred embodiments, the related art and the disadvantages therein will be explained in further detail with reference to the drawings for background purposes.

Figure 12:
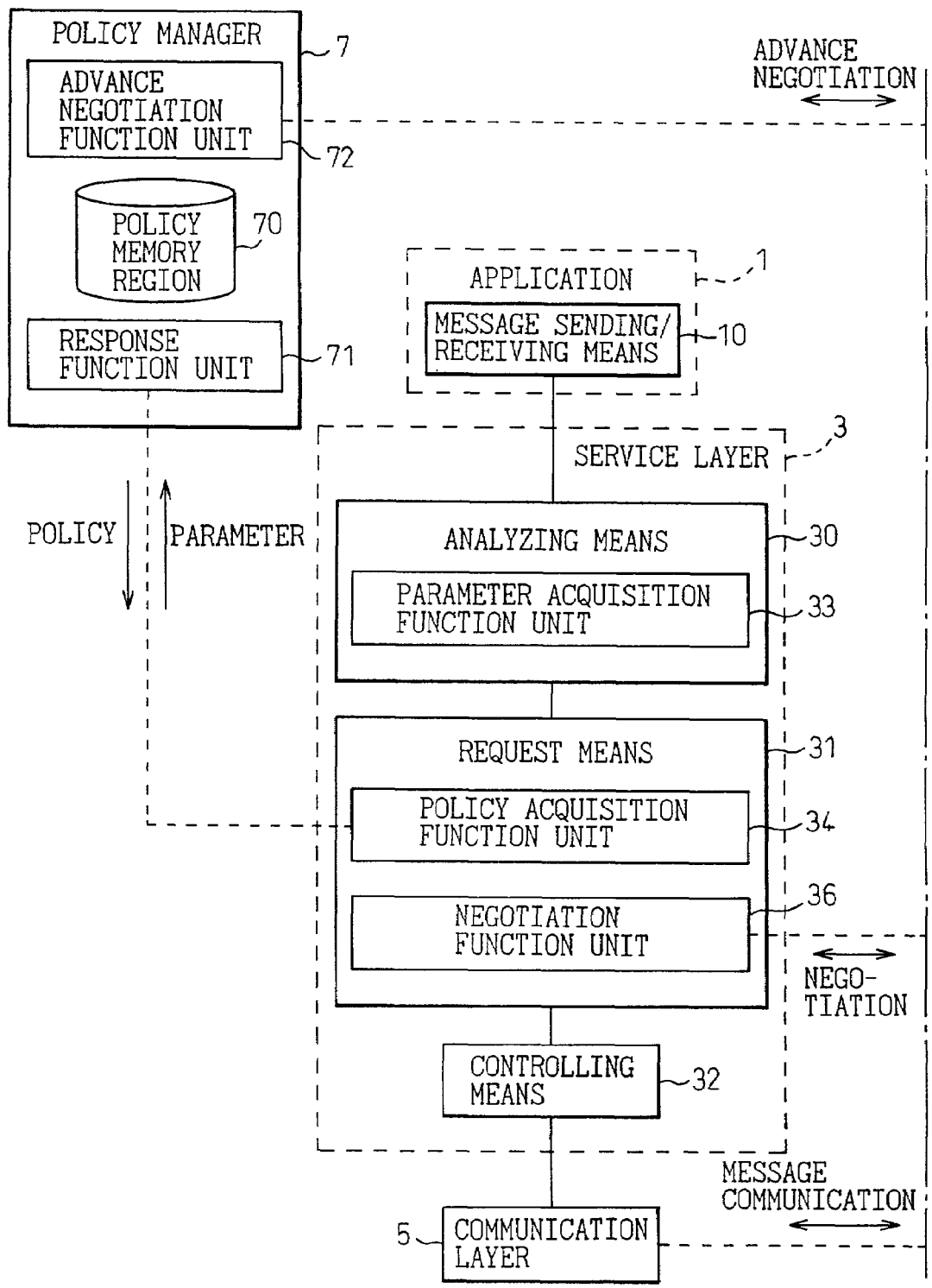
FIG. 12 is a first part of a view of a previously proposed distributed environment type computer system.
Figure 13:
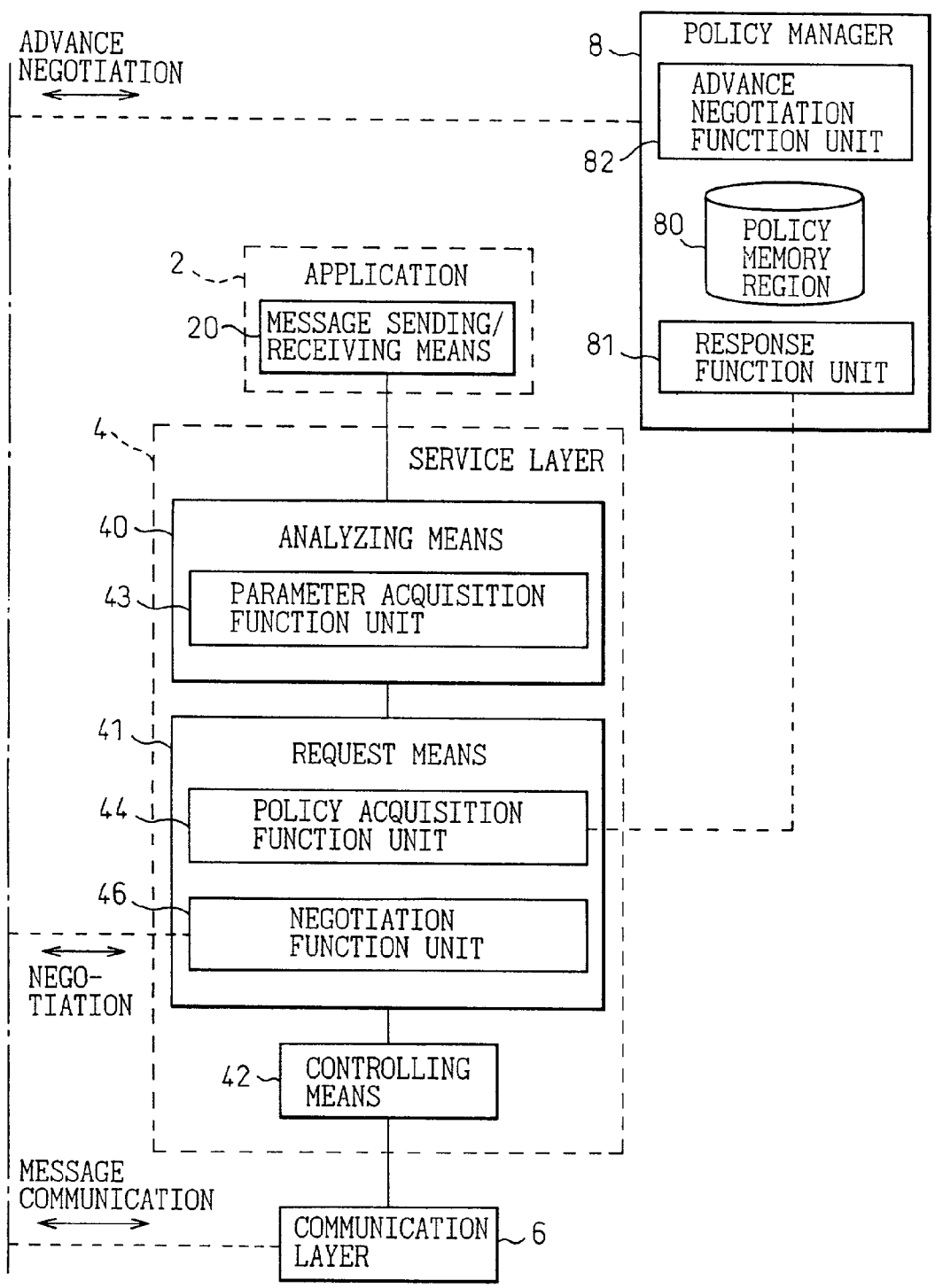
FIG. 13 is a second part of a view of a previously proposed distributed environment type computer system.

FIG. 12 and FIG. 13 are parts of a view of a previously proposed distributed environment type computer system.

First, the distributed environment type computer system shown in FIG. 12 and FIG. 13 will be explained in brief.

In the distributed environment explained above, the system configuration of FIG. 12 and FIG. 13 is characterized by the introduction of service layers (3, 4) providing additional services not realizable by the communication layers between the communication layers (5, 6) and the application software (1, 2).

The service layers are independent from the communication layers and the application software and provide additional services. Due to this, it is possible to eliminate the trouble of developing application software while maintaining the general applicability of both the communication layers and application software. In this respect, the service layers are advantageous. Note that as a known example of such a service layer, there is a CORBA security service disclosed in the following Reference 1:

Reference 1: Object Management Group (OMG), CORBA Services: Security Service Specification, Version 1.7, December 1999 (available from (http://www.omg.org/technology/documents/formal/security-service.htm)

Further, the security service layers shown in FIG. 12 and FIG. 13 are disclosed in the following Reference 2, Reference 2', Reference 2", and Reference 3.

Reference 2: Institute of Electronics, Information, and Communications Engineers, Ninth Telecommunications Management (TM) Research Conference (preprints distributed on May 18, 2000) (related materials available from http://www.ieice.or.jp/cs/tm/jpn/tmken/tm-9.html)

Reference 2': International Conference APNOMS2000 (draft copy presented May 26, 2000, camera ready copy presented on August 25, and preprints distributed October 11) (related materials available from http://www.ieice.or.jp/cs/tm/apnoms/2000/)

Reference 2": German Patent Application No. 10024347.9 (filed May 17, 2000)

[Note: References 2, 2', and 2", are substantially the same in content]

Reference 3: Japanese Patent Application No. 2001-55323 "Communication Security Management System and Program of Same" (filed Feb. 28, 2001)

In general, in a distributed environment, the service function portion comprising the service layers (3, 4) is distributed along with the distributed application software. Therefore, the above service function portion is instructed on the method of operation from the outside. By managing the content of the instructions all together at one location for each management area (one unit of group of computer systems to be managed), it is possible to eliminate the trouble of managing the methods of operation all over the place and possible to improve the system efficiency. The content of an instruction on the method of operation is called a "policy". The above references disclose to manage the service layers by such policies.

More specifically, References 2, 2', and 2" describe frameworks for negotiating with other parties in communication to determine the policies for use in the service layers (3, 4). Further, Reference 3 describes a framework for negotiating a policy in advance so as not to cause a difference with the other party in communication in policy managers (7, 8).

Here, refer to FIG. 12 and FIG. 13.

As illustrated in these figures, a distributed environment type computer system can be roughly divided into applications (application software) 1 and 2, service layers 3 and 4, communication layers 5 and 6, and policy managers 7 and 8.

The applications 1 and 2 are application software for message communications using the communication layers 5 and 6 and use the message sending/receiving means 10 and 20 for communication.

The service layers 3 and 4 are present between the applications 1 and 2 and the communication layers 5 and 6 and provide additional services not provided by the communication layers 5 and 6 in place of the applications. The service layers 3 and 4 are comprised of analyzing means 30 and 40, requesting means 31 and 41, and controlling means 32 and 42. The requesting means 31 and 41 are provided with policy acquisition function units 34 and 44 and negotiation function units 36 and 46.

On the other hand, the policy managers 7 and 8 are provided with policy memory areas 70 and 80, response function units 71 and 81, and advance negotiation function units 72 and 82.

The computer system shown in FIG. 12 and FIG. 13 is constructed based on the above References 2, 2', 2", and 3. The computer system can be used in actual practice, but has the disadvantage that the processing time and the communication time by which the service layers 3 and 4 acquire a policy end up becoming long. Therefore, the present assignee devised the computer system shown in FIG. 14 and FIG. 15.

Figure 14:
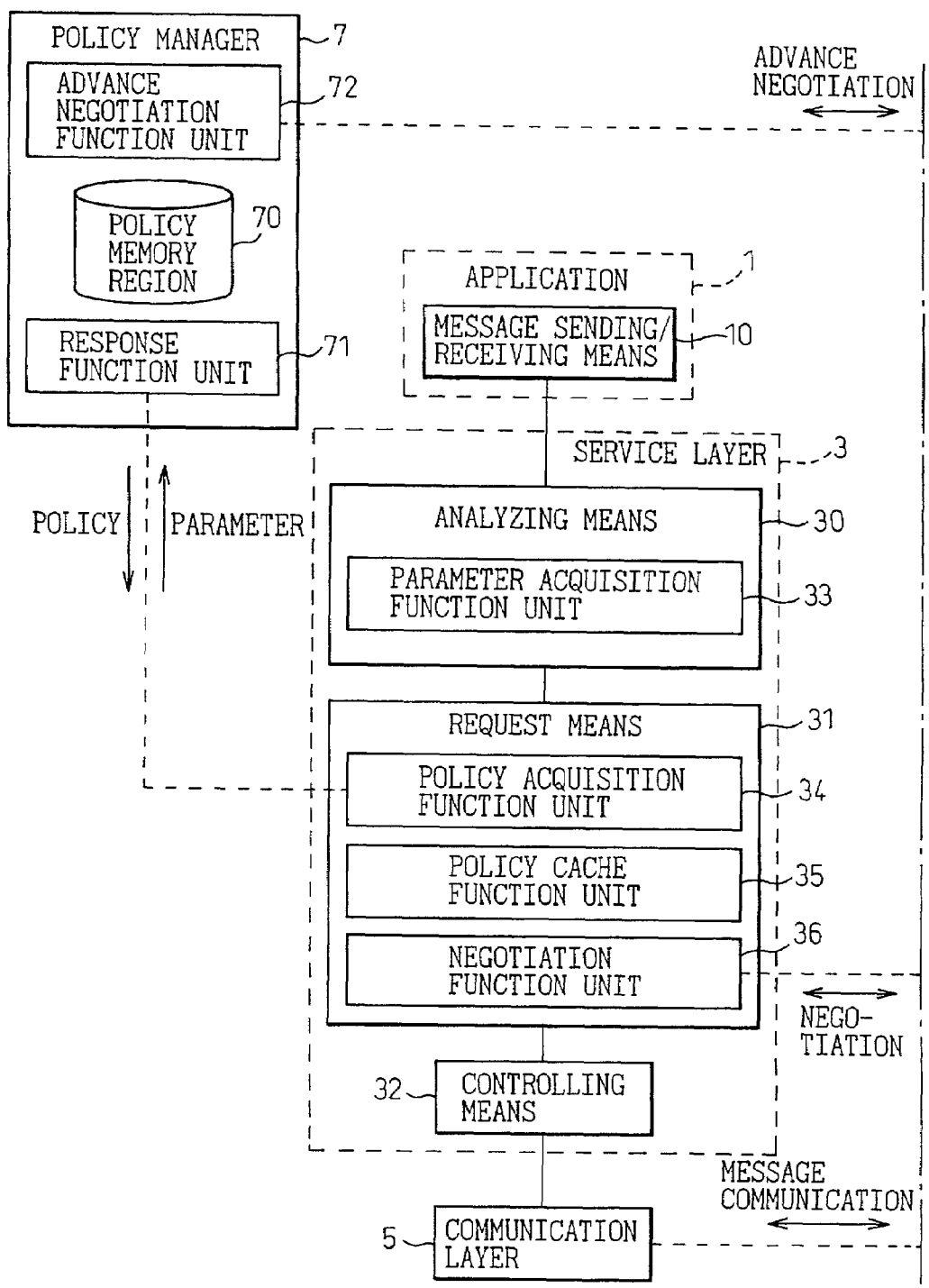
FIG. 14 is a first part of a view of a distributed environment type computer system upon which the present invention is predicated.
Figure 15:
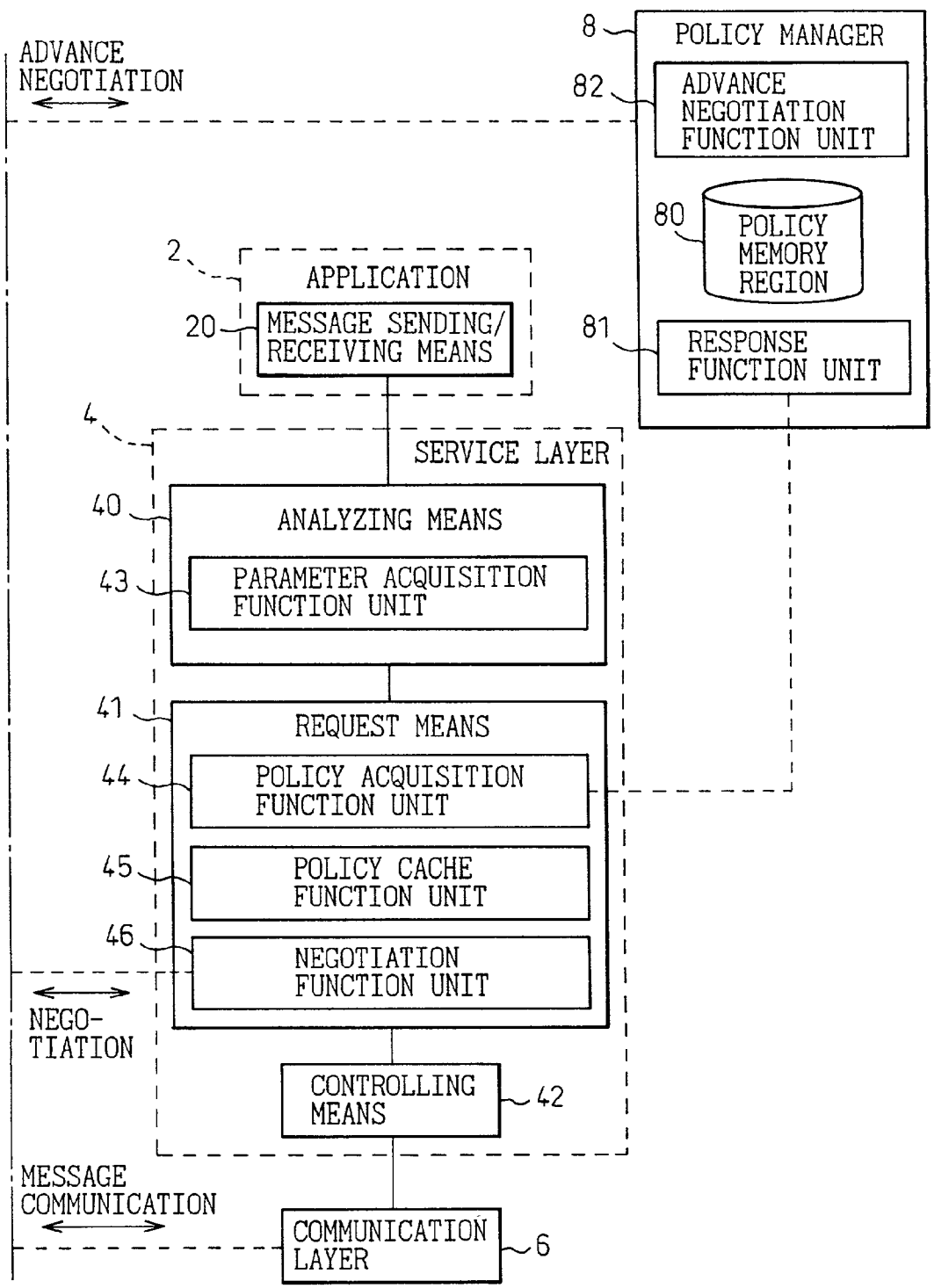
FIG. 15 is a second part of a view of a distributed environment type computer system upon which the present invention is predicated.

FIG. 14 and FIG. 15 are parts of a view of a distributed environment type computer system upon which the present invention is predicated.

As shown in these figures, the distributed environment type computer system upon which the present invention is predicated comprises the system configuration shown in FIG. 12 and FIG. 13 plus the policy cache function units 35 and 45.

If using a temporary memory area broadly in use in computer systems or communication systems, that is, a cache framework, in this way, the processing time and the communication time, etc. when acquiring a policy, can be shortened and the operation of the service layers 3 and 4 can be made much higher in speed.

If actually trying to run the computer system shown in FIG. 14 and FIG. 15, however, it is found that new disadvantages end up arising (explained later). A fully practical computer system has not yet been developed. That is, further improvements are necessary. The present invention makes such improvements (explained later).

Here, the operation of the system shown in FIG. 14 and FIG. 15 will be simply explained.

Figure 16:
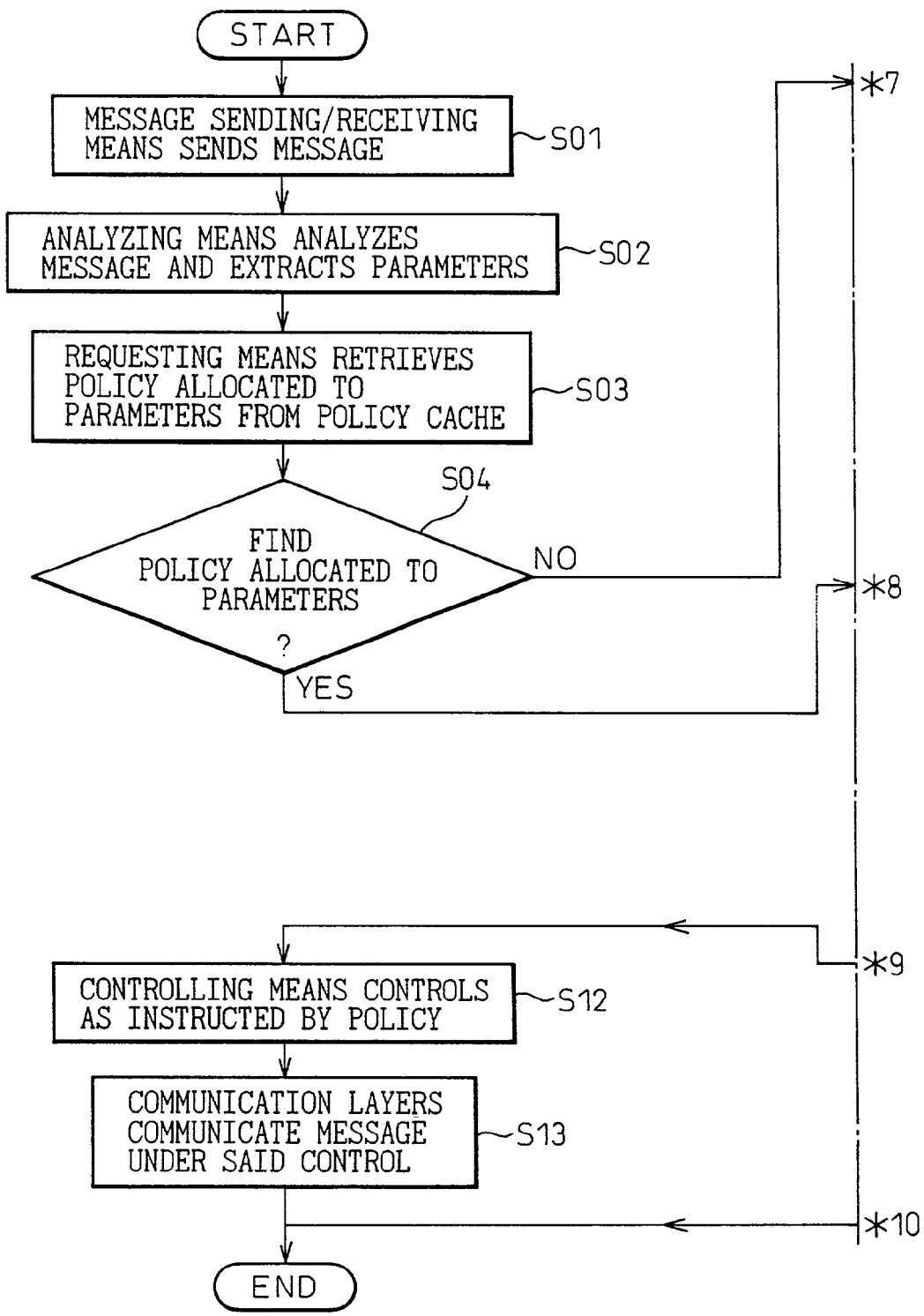
FIG. 16 is a first part of a flow chart showing the flow of processing in a computer system upon which the present invention is predicated shown in FIG. 14 and FIG. 15.

FIG. 16 and FIG. 17 are parts of a flow chart showing the flow of processing in a computer system upon which the present invention shown in FIG. 14 and FIG. 15 is predicated.

Note that the distributed environment type computer system handled by the present invention covers a plurality of computer systems, but for simplification, only two computer systems are illustrated. Further, these two computer systems perform substantially the same processing, so the computer system handling application 1 (FIG. 14 and FIG. 1) is explained as a representative example. The computer system handling application 2 (FIG. 15 and FIG. 2) will be simply referred to as the computer system of the "other party" or the application of the "other party".

Referring to FIG. 16 and FIG. 17, when the application 1 sends a message to the application 2 using the message sending/receiving means 10 (S01), the analyzing means 30 of the service layer 3 analyzes the message using a parameter acquisition function unit 33 and extracts from it the parameters necessary for controlling the services (S02).

The extracted parameters are transferred to the requesting means 31. The requesting means 31 acquires the policy corresponding to the parameters by retrieving that policy from a group of policies cached in a policy cache function unit 35 (S03). If there is no such policy, it inquires at the policy manager 7 (NO at S04, S05).

When obtaining a policy from the policy manager 7 (YES at S06), the means stores that policy in the policy cache function unit 35 (S07). If no policy can be obtained (NO at S06), the routine proceeds to step S11.

Next, the means negotiates with the requesting means 41 of the other party in the communication using the negotiation function unit 36 as to whether the obtained policy may be used to control the service (S08). If the negotiations succeed (YES at S09), the policy is transferred to the controlling means 32. The controlling means 33 controls the service as instructed by the policy (S12). The message is communicated through the communication layers 5 and 6 under this control. The message sending/receiving means 20 of the application 2 of the other party can then receive that message (S13).

In this case, to reduce the chances for failure in negotiations, the policy manager 7 and the policy manager 8 of the other party may negotiate in advance using advance negotiation function units 72 and 82 to match policies to be sent back from the response function units 71 and 81.

As explained earlier, in certain types of modes of use of distributed environments, sometimes the applications transfer large numbers of different types of messages in a short time. For example, a remote control application realized using the above CORBA (i) sends a request for inquiring about the internal status of another application, (ii) sends a request for processing, (iii) sends a request for inquiry once again, and (iv) sends another request for processing, that is, sometimes a large number of different requests are asked to be made within a short time.

Figure 3:
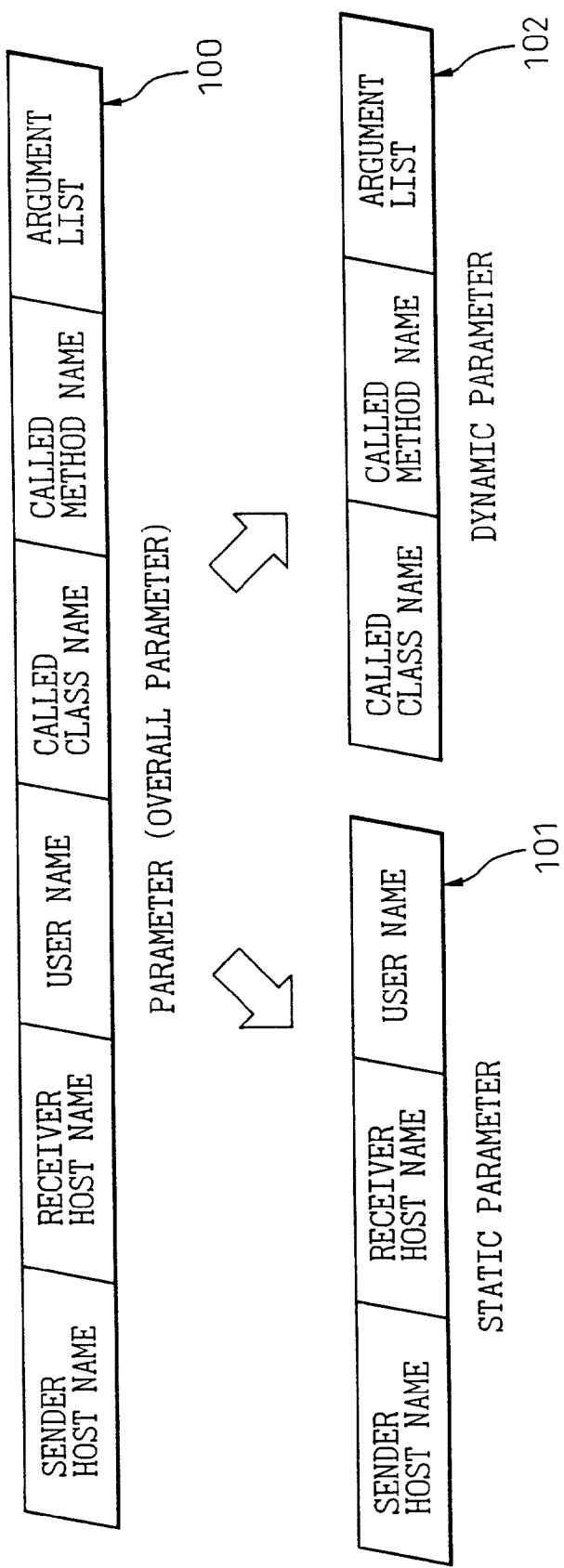
FIG. 3 is a view explaining the division of parameters according to the present invention.
Figure 4:
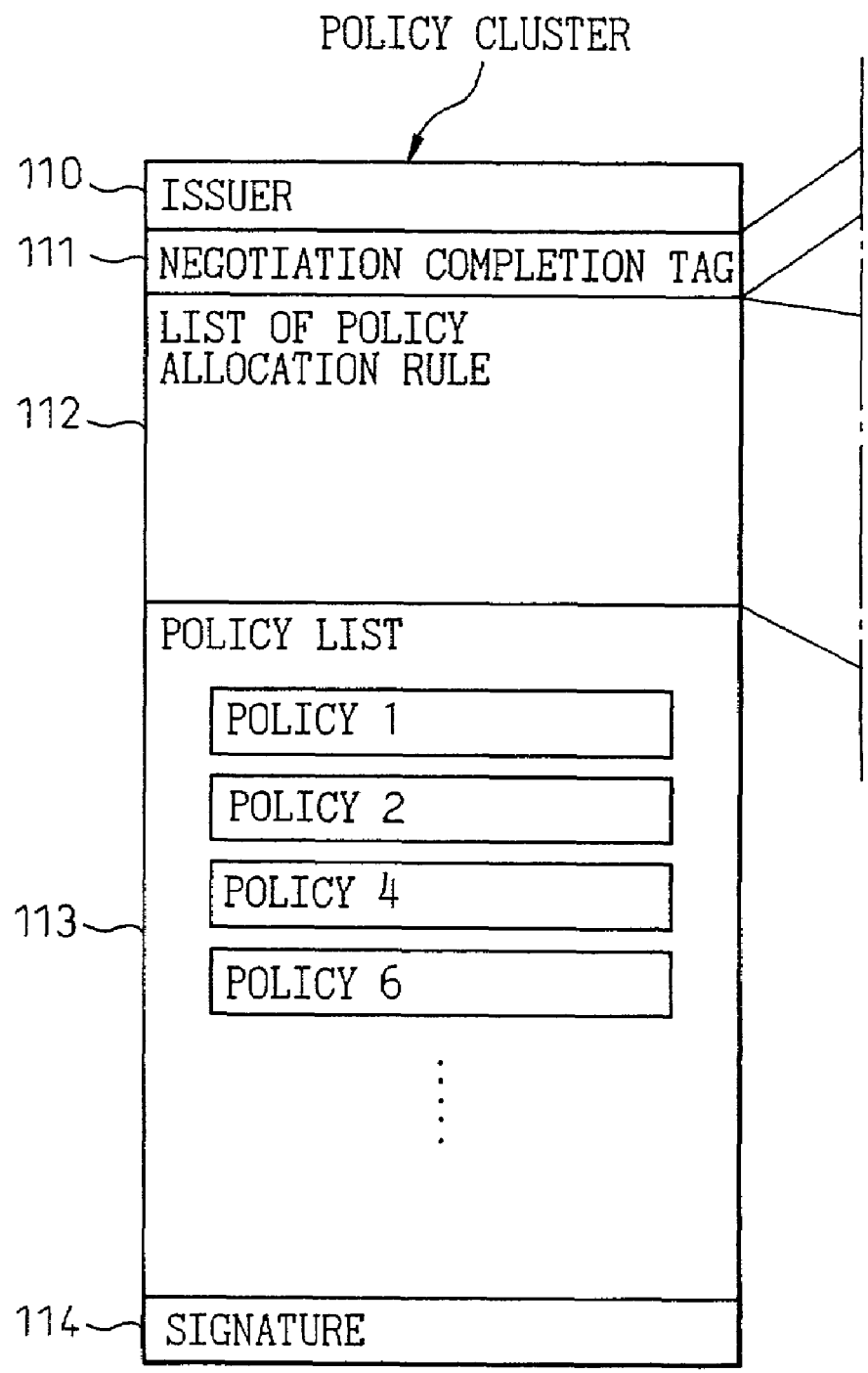
FIG. 4 is a first part of a view of the configuration of a policy cluster according to the present invention.

In such a case, in the system configuration of FIG. 3 and FIG. 4, each time there is a new request (aforementioned various requests), a so-called "cache misshit" occurs where a suitable policy cannot be acquired from the policy cache function unit 35 (45) and excess time ends up being spent for acquiring a policy from the policy manager 7 (8). In this way, despite the presence of a cache mechanism, there is above-mentioned first problem that this cache misshit makes efficient operation impossible.

On the other hand, faced with such a cache misshit, a cache in a general computer system, for example, fetches and caches certain corresponding areas in the memory consecutively. Due to this, cache misshits in consecutive memory access are prevented. This is general practice. In the case of the above policy cache, however, often the group of required policies are not consecutive. Therefore, the above general cache could not exhibit its inherent effectiveness. In other words, in the above case, there was the above second problem that the policies had to be acquired based on a suitable strategy predicting the required policies.

Further, in a system configuration of FIG. 14 and FIG. 15, even if policies were suitably cached, the service layer 3 had to negotiate with the service layer 4 of the other party in the communication for each policy. Therefore, there was the above third problem that communication time and processing time were required for the negotiations and excess time ended up being spent.

Further, in the system configuration of FIG. 14 and FIG. 15, the negotiation over policy between the policy managers 7 and 8 was completed in advance and the negotiations between the service layers 3 and 4 during the communications were eliminated, but no means have been realized for guaranteeing the reliability of the completion of the advance negotiations. Therefore, the service layers 3 (4) cannot prevent the occurrence of mismatches of policies due to illegitimate actions or human error in settings at the policy managers 7 (8) or mismatches of policies due to errors in transmission of policies arising due to communication errors.

Further, in the system configuration of FIG. 14 and FIG. 15, there was the above fourth problem that, in the above type of mode of use, excess time is taken in the communication of messages and the reliability of the negotiations over policies performed between two service layers cannot be guaranteed. This was disadvantageous to the user.

The present invention was made in consideration of the above problems and provides a computer system able to greatly reduce the processing which the service layer 3 performs for each message communication for inquiring about a policy to the policy manager 7 or able to eliminate the processing for negotiations relating to application of a policy performed with the service layer 4 of another party and therefore enabling a service layer 3 to execute consecutive message communications at a high speed.

Further, the present invention provides a service layer, policy cache function unit, and policy manager for such a computer system. The present invention will be described in detail below.

In the present invention, policies are cached by the technique of, first, dividing the parameters handled in the service layer 3 into "static parameters" and "dynamic parameters". "Static parameters" are parameters which do not change over a relatively long period, while "dynamic parameters" are parameters which change over a relatively short period.

Second, to display whether a policy cached at the policy cache function unit 35 has finished being negotiated or not, the function unit 35 is given a "negotiation completion flag".

Third, to enable the service layer 3 to acquire a plurality of policies all together from the policy manager 7, use is made of a "policy cluster" comprised of a set of a plurality of policies and allocation rules for allocating the policies to the parameters.

Fourth, to display the fact that the policy cluster as a whole generated by the policy manager 7 has finished being negotiated in advance with the policy manager 8 of the other party, the policy cluster is given a "negotiation completion tag". This negotiation completion tag has a value agreed upon between the plurality of policy managers (7, 8).

Fifth, to guarantee the fact that the policy cluster as a whole has finished being negotiated, the policy cluster is given "signature information".

According to the computer system of the present invention employing the above first to fifth techniques, the following effects are obtained:

a) It is possible to strategically cache a group of policies required in a certain period by static parameters which do not change over a long period. Therefore, the frequency of cache misshits falls and the time required for communicating messages can be shortened.

b) Further, by marking already negotiated policies by negotiation completion flags in the policy cache function unit 35, it is possible to eliminate negotiations to be performed the second and later times and possible to further shorten the time required for message communications.

c) Further, by using the policy cluster, it is possible to acquire a group of policies and allocation rules of the parameters of the policies all together. Further, the fact that the policy cluster as a whole has finished being negotiated can be easily confirmed by the service layer 3 by one negotiation. Further, by having the signature information in the policy cluster verified by the service layer 3, it is possible to detect an illegitimate policy cluster or the occurrence of human error, communication error, etc. and possible to further improve the reliability.

Figure 1:
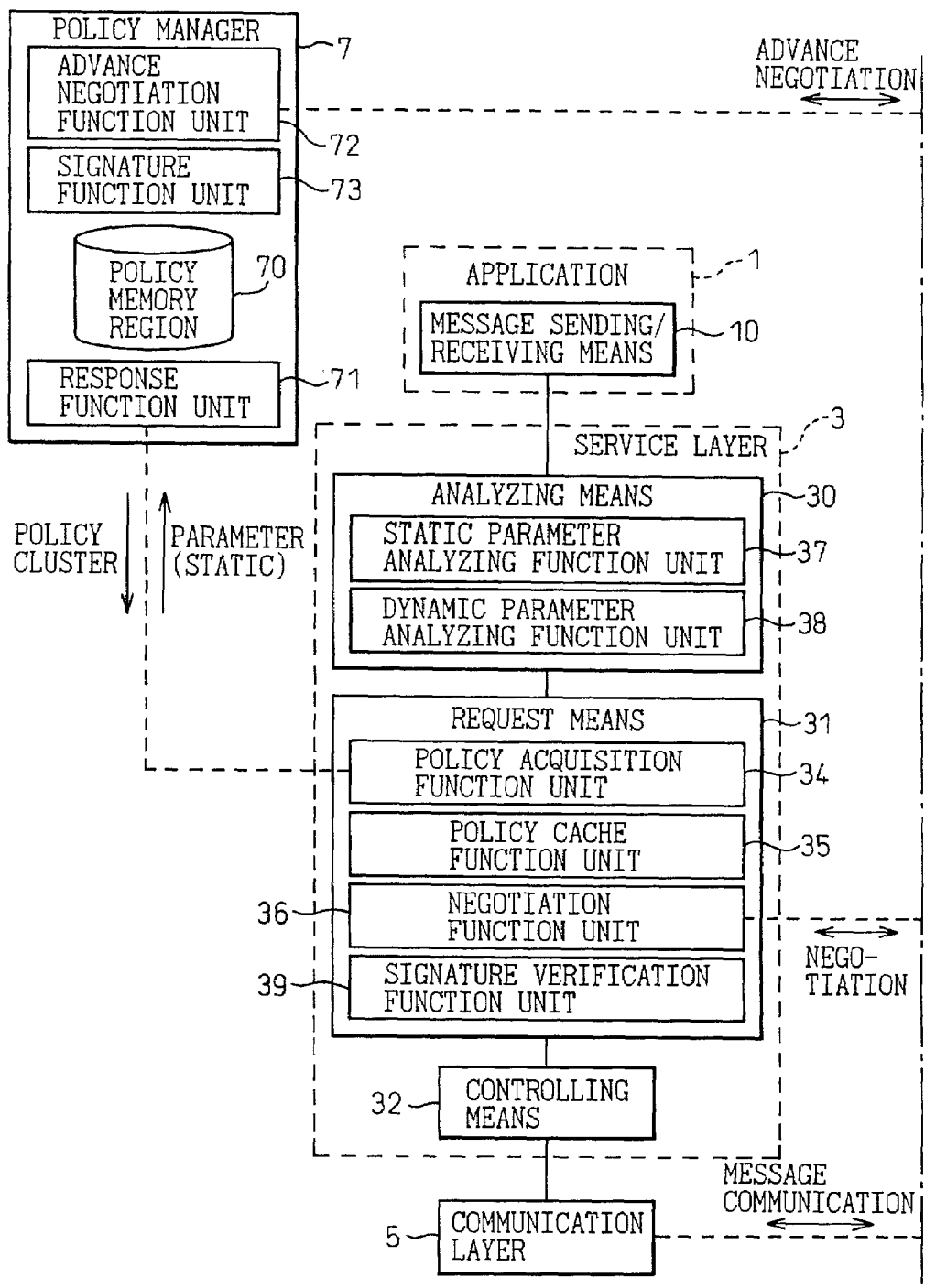
FIG. 1 is a first part of a view of the basic configuration of a distributed environment type computer system according to the present invention.
Figure 2:
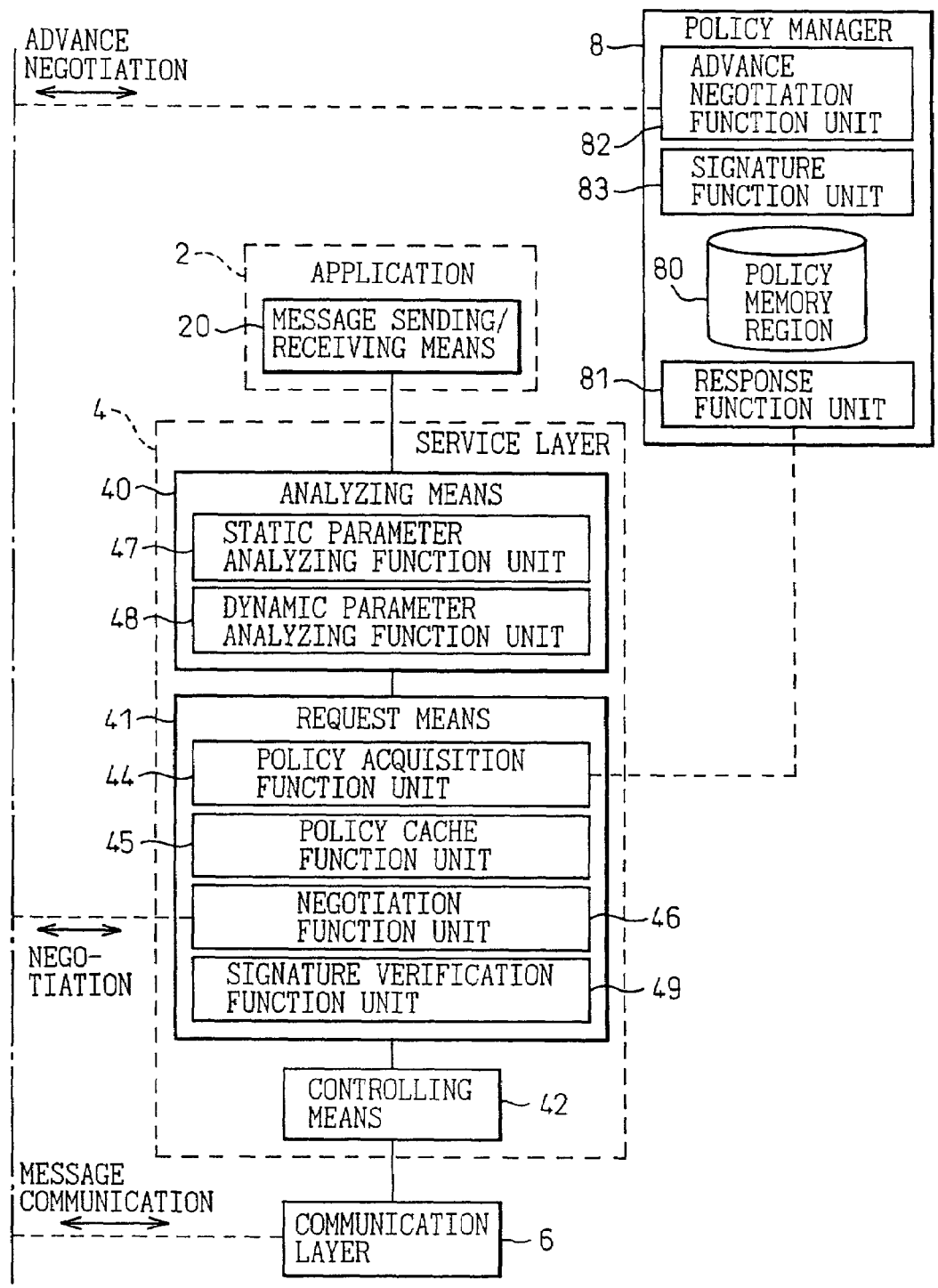
FIG. 2 is a second part of a view of the basic configuration of a distributed environment type computer system according to the present invention.

FIG. 1 and FIG. 2 are parts of a view of the basic configuration of a distributed environment type computer system according to the present invention.

Note that throughout the figures, similar constituent elements are assigned the same reference numerals or symbols.

The computer system (FIG. 1) handling the application 1 among the two computer systems illustrated will be explained below as a representative case.

The computer system shown in FIG. 1 is basically similar to the computer system shown in FIG. 14 and FIG. 15.

That is, the computer system is provided with a message sending/receiving means 10 for transferring a series of messages based on an application 1, a service layer 3 for providing a specific additional service to the application 1 in accordance with a policy of specific control or instructions to each message, a policy manager 7 for holding and centrally managing various policies and supplying a policy corresponding to a message in accordance with a request for acquisition from the service layer 3, and a communication layer 5 for transferring messages given the service by the service layer 3 in accordance with the policy with the application 2 of the other party.

In this computer system, one feature of the present invention is the analyzing means 30 and requesting means 31 in the service layer 3.

The analyzing means 30 extracts the parameters described in a message for specifying the message, while dividing it into static parameters not changing over a relatively long period and dynamic parameters changing over a relatively short period.

The requesting means 31 requests the acquisition of a group of policies allocated to static parameters from the policy manager 7 using the extracted static parameters.

The policy manager 7 receives a request for acquisition of a group of policies using the static policies from the requesting means 31 in this way has a response function unit 71 for generating a policy cluster and returning it to the requesting means 31 when receiving the request. Here, the policy cluster is comprised of at least a group of policies corresponding to overall parameters comprised of the static parameters and various changing dynamic parameters and policy allocation rules indicating the allocations of the group of policies corresponding to the overall parameters (see FIG. 5 and FIG. 6).

The requesting means 31 for acquiring a policy cluster returned from the response function unit 71 in this way is provided with a policy cache function unit (35). The policy cache function unit 35 temporarily stores in a readable manner the above policy cluster returned from the policy manager 7. After the start of the transfer of a message, when a policy cluster allocated to the overall parameters sent is stored in the policy cache function unit 35, the corresponding policy is acquired from there.

Figure 7:
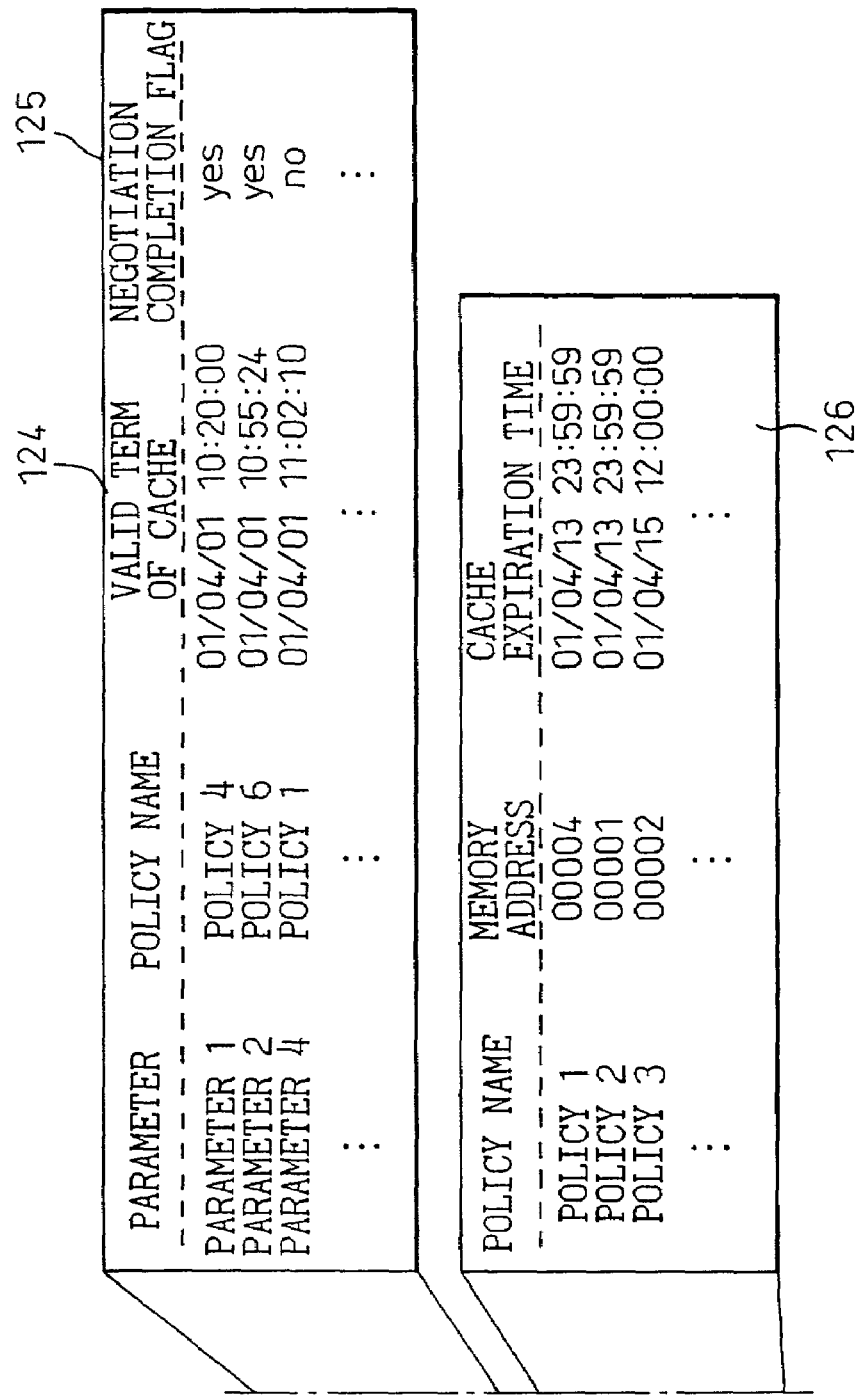
FIG. 7 is a second part of a view of the configuration of a policy cache function unit according to the present invention.

The policy cache function unit 35 is provided with a negotiation completion flag area (see FIG. 7). A negotiation completion flag is a flag displaying that agreement has been reached when the service layer 4 of the other party supporting the application 2 of the other party is negotiated with in advance and agreement has been reached on the policy to be used between the two.

As another one related to the above negotiation completion flag, a negotiation completion tag (see FIG. 4) is used. That is, the policy manager 7 negotiates in advance with the policy manager 8 of the other party supporting the application 2 of the other party and, when agreement is reached between the two on the policy to be used, records a negotiation completion tag displaying that agreement has been reached in the policy cluster. Further, the policy manager 7 has a signature function unit 73 generating a signature (see FIG. 4) guaranteeing that the content of the policy cluster is legitimate.

Related to the negotiation completion flag is the negotiation function unit 36. That is, the requesting means 31 has a negotiation function unit 36 which uses the negotiation completion tag displayed in a policy cluster to confirm the legitimacy of the negotiation completion tag in advance with the service layer 4 of the other party when acquiring a policy cluster from the policy manager 7. Here, the negotiation function unit 36 negotiates for the plurality of policies included in the policy cluster all together.

The requesting means 31 has a signature verification function unit 39 provided corresponding to the above signature function unit 73 for verifying that the signature displayed in the policy cluster is legitimate when acquiring a policy cluster from the policy manager 7.

To further improve the understanding of the above computer system, the above-mentioned "parameters", "policy clusters", and "policy cache function unit" will be explained below in detail.

[Parameters]

The present invention assumes that the parameters are comprised of a plurality of items and assumes that these are valid in most cases.

In most modes of use, only part of the parameters for acquiring a policy change over a short period. Taking as an example the above CORBA, in the application 2 of the other party in the communication, the class name called (or the interface name), the method name called (or the operation name), the argument list given, etc. change remarkably in a relatively short period.

As opposed to this, the names (identifiers) of the two hosts communicating with each other and also the name of the user using the application, etc. do not change over a relatively long period. This will be explained with reference to FIG. 3.

FIG. 3 is a view explaining the division of the parameters according to the present invention.

As shown in the figure, the parameters (overall parameters) 100 are classified into static parameters 101 comprised of items not easily changing over a long period and dynamic parameters 102 comprised of items easily changing over a short period. In other words, items which cannot be determined until the service layer 3 actually receives the message may be defined as dynamic parameters, while items which the service layer can determine before receiving the message may be defined as static parameters.

The dynamic parameters 102 are extracted by the analyzing means 30 from the messages by the dynamic parameter analyzing function unit 37.

On the other hand, the static parameters 101 are extracted by the static parameter analyzing function unit 38 provided in the analyzing means 30. The static parameters 101 do not change over the long term, so it is possible to delimit part (or all) of the group of policies required when the static parameters 101 are fixed and only the dynamic parameters 102 change among the overall parameters 100.

[Policy Cluster]

When transferring a specific group of policies from the policy manager 7 (8) to the service layer 3 (4), it is desirable to transfer a plurality of groups of policies all together. Therefore, allocation rules for determining which policy should be used in which case (that is, at what value of a dynamic parameter) are also transferred for such groups of policies. The present invention introduces the above-mentioned policy cluster combining these.

Figure 5:
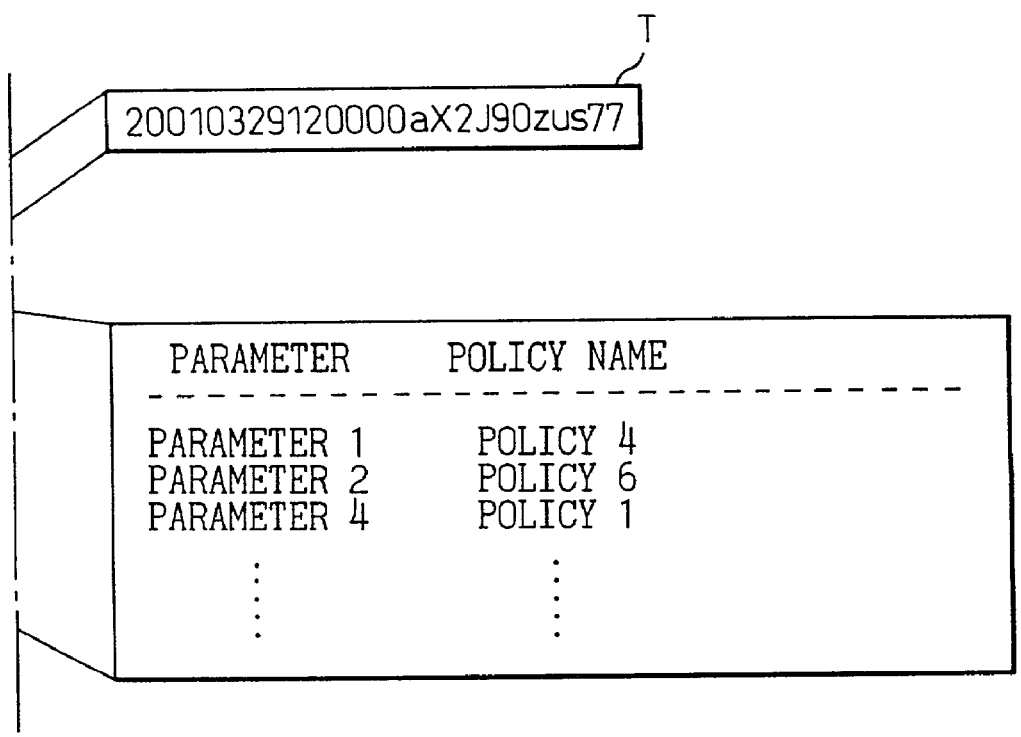
FIG. 5 is a second part of a view of the configuration of a policy cluster according to the present invention.

FIG. 4 and FIG. 5 are parts of a view of the configuration of a policy cluster according to the present invention.

The policy cluster generated by the policy manager 7 includes a policy list 113, a policy allocation rule list 112, a negotiation completion tag 111, and other auxiliary information (in the illustrated example, the issuer information 110), and information on a digital signature 114 given to the same. Note that a digital signature is prepared from certain data by a certain type of arithmetic operation and is a cryptographic technique enabling verification of the integrity of the content or source of the data. One using the RSA (Rivest, Shamir, and Adleman) calculation algorithm is widely known.

In the example of FIG. 4, the issuer name 110 may be any information, but in the case of showing the source by the signature 114, it is a name or identifier indicating the party giving the signature.

The negotiation completion tag 111 may also be any information, but the method of determination of the value will be explained later.

Next, the list of the policy allocation rules 112 lists the allocation rules for policies for parameters (overall parameters) comprised of sets of the values of the parameters and the policy names. Note that in the case of a policy cluster acquired by static parameters, the values of the parameters usually are held by all of the same designated static parameter portions.

The policy list 113 lists the policies indicated in the list of the policy allocation rules 112.

The signature 114 is a digital signature given to all data of a policy cluster other than the section on the signature 114 by a predetermined signature method.

[Policy Cache Function Unit]

Figure 6:
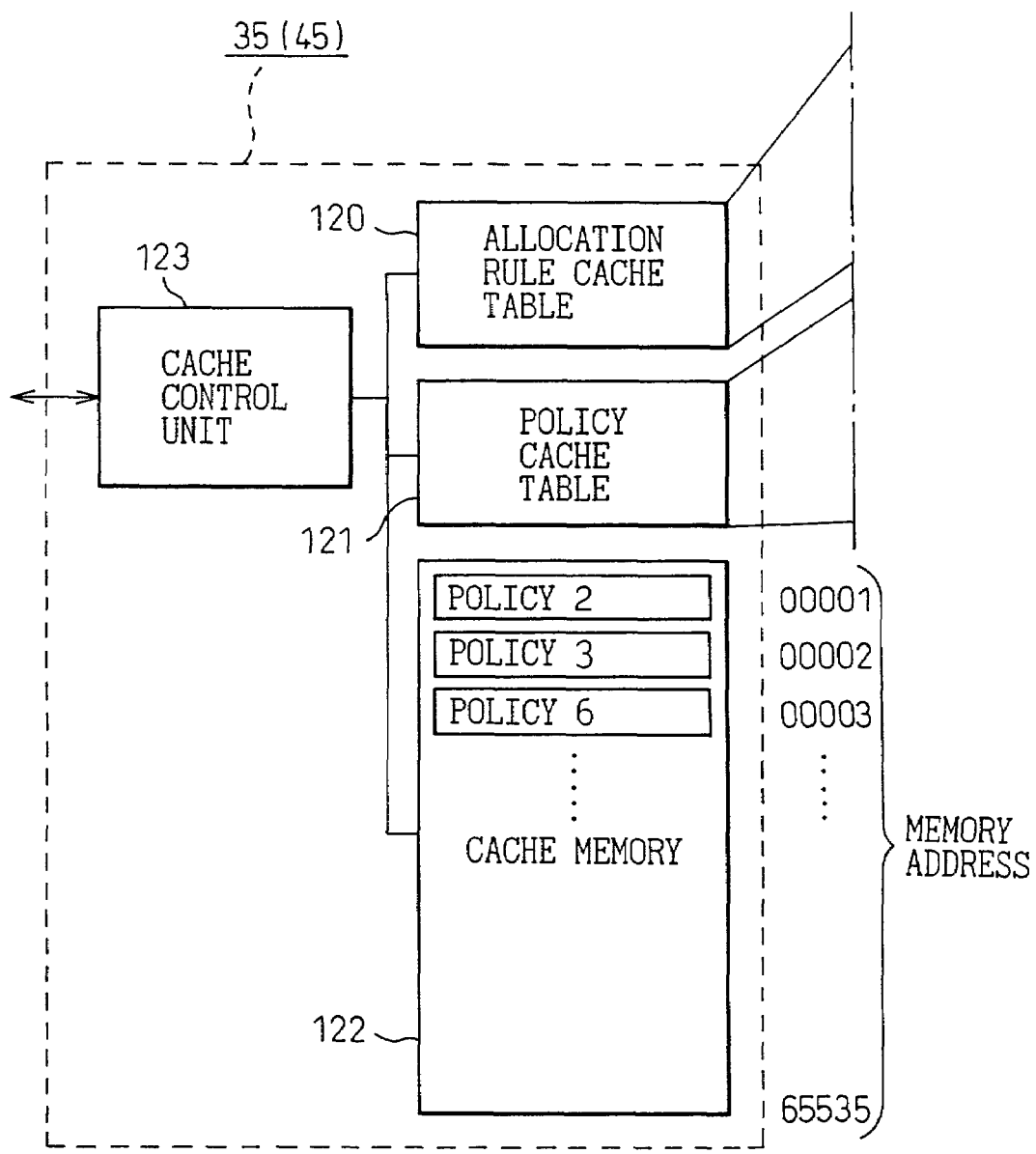
FIG. 6 is a first part of a view of the configuration of a policy cache function unit according to the present invention.

FIG. 6 and FIG. 7 are parts of a view of a policy cache function unit according to the present invention.

A group of policies (also sometimes a single policy) acquired by the service layer 3 (4) all together in the form of a policy cluster (FIG. 4 and FIG. 5) can be temporarily stored in the policy cache function unit 35 (45) through a suitable process.

The policy cache function unit 35 is comprised of a cache memory 122 for storing policies, a policy cache table 121 for recording the memory addresses of the policies, and a cache control unit 123 for writing, reading, retrieving, etc. data using the memory or table.

The policy cache function unit 35 is characterized by the facts that:

(i) the cache table is comprised of an allocation rule cache table 120 for retrieving policy names using the parameters (overall parameters) as a key and a policy cache table 121 for retrieving the policy memory addresses using the policy names as a key and (ii) the allocation rule cache table 120 is given a negotiation completion flag 125 for recording whether or not a policy designated by individual table items has finished being negotiated. The items of the policy cache table 121 have the same meaning as the policy allocation rules.

Note that in the example of FIG. 7, both of the cache tables 120 and 121 are given information on the cache expiration dates 124 and 126. This information however is added only when necessary.

Here, the characterizing configurations of the service layer 3 (4), cache function unit 35 (45), and policy manager 7 (8) will be described all together and finally the flow of processing of the computer system as a whole shown in FIG. 1 and FIG. 2 will be explained with reference to FIG. 8 to FIG. 11.

[Service Layer]

First, looking at the service layer 3, the service layer provides a specific additional service in accordance with a policy to a series of messages transferred based on the application 1 while contacting an outside policy manager 7. The service layer 3 has an analyzing means 30 for extracting from a message, for specifying the same, the parameters described in the message, while dividing it into static parameters 101 not changing over a relatively long period and dynamic parameters 102 changing over a relatively short period and a requesting means 31 for requesting from the policy manager 7 the acquisition of the group of policies allocated to the static parameters 101 by using the extracted static parameters 101.

Further, the service layer has a controlling means 32 for executing an additional service in accordance with a policy.

Further, the above analyzing means 30 is comprised of a static parameter analyzing function unit 37 for extracting static parameters 101 and a dynamic parameter analyzing function unit 38 for extracting dynamic parameters 102.

On the other hand, the requesting means 31 has a policy acquisition function unit 34 for acquiring a group of policies allocated from the policy manager 7 for the static parameters 101 using the static parameters 101 described in a message sent to the application 2 of the other party.

Further, the requesting means 31 has a policy cache function unit 35 for temporarily storing in a readable manner the group of policies acquired from the policy acquisition function unit 34.

Further, the requesting means 31 has a negotiation function unit 36 for negotiating for agreement between the two parties (3, 4) regarding the policy to be used with the service layer 4 of the other party supporting the application 2 of the other party for each policy of the group of policies acquired from the policy manager 7 or the policy cache function unit 35.

Further, the requesting means 31 has a signature verification function unit 39 for verifying if a signature 114 described for a group of policies acquired from the policy manager 7 or from the policy cache function unit 35 is legitimate.

[Policy Cache Function Unit]

Next, looking at the policy cache function unit 35, the policy cache function unit is provided in the service layer 3 providing a specific additional service in accordance with a policy to a series of messages transferred based on an application while contacting an external policy manager 7. The policy cache function unit 35 has a cache memory 122 for acquiring from the policy manager 7 and temporarily storing one or more policies for specific control or instructions to the messages, a policy cache table 121 for recording memory addresses in the cache memory 122 storing the policies in correspondence with the policies, and an allocation rule cache table 120 for establishing allocation rules of policies for the parameters described in the messages so as to specify the messages.

The allocation rule cache table 120 negotiates in advance with the service layer 4 supporting the application 2 of the other party transferring the message and includes an area of a negotiation completion flag 125 for displaying that agreement has been reached on a policy recorded in the allocation rule cache table 120 when agreement is reached on the policies to be used between the two (3, 4).

[Policy Manager]

Finally, if looking at the policy manager 7, it contacts the service layer 3 providing a specific additional service for a series of messages transferred based on the application 1 and supplies to this service layer 3 one or more policies for specific control or instructions to the messages. The policy manager 7 has a response function unit 71 for generating a policy cluster (FIG. 4 and FIG. 5) and returning it to the service layer 3 when acquisition of a policy is requested by the service layer 3 by static parameters 101 among parameters described in the message for specifying the message classified into static parameters 101 not changing over a relatively long period and dynamic parameters 102 changing over a relatively short time. Here, a policy cluster is comprised of at least a group of policies corresponding to the overall parameters (FIG. 3) comprised of static parameters 101 and various changing dynamic parameters 102 and policy allocation rules 112 showing the allocation of each of the group of policies with respect to each of the overall parameters.

On the other hand, the policy manager 7 has an advance negotiation function unit 73 which negotiates in advance with the policy manager 8 of the other party supporting the application 2 of the other party transferring the message and generates a negotiation completion tag 111 for recording the fact of agreement when the two (7, 8) reach agreement on the policy to be used in the policy cluster (FIG. 4 and FIG. 5) and preferably has a signature function unit 73 for generating a signature 114 for guaranteeing that the content of the policy cluster is legitimate.

Finally, the flow of the processing of the computer system as a whole according to the present invention shown in FIG. 1 and FIG. 2 will be explained with reference to flow charts.

Figure 8:
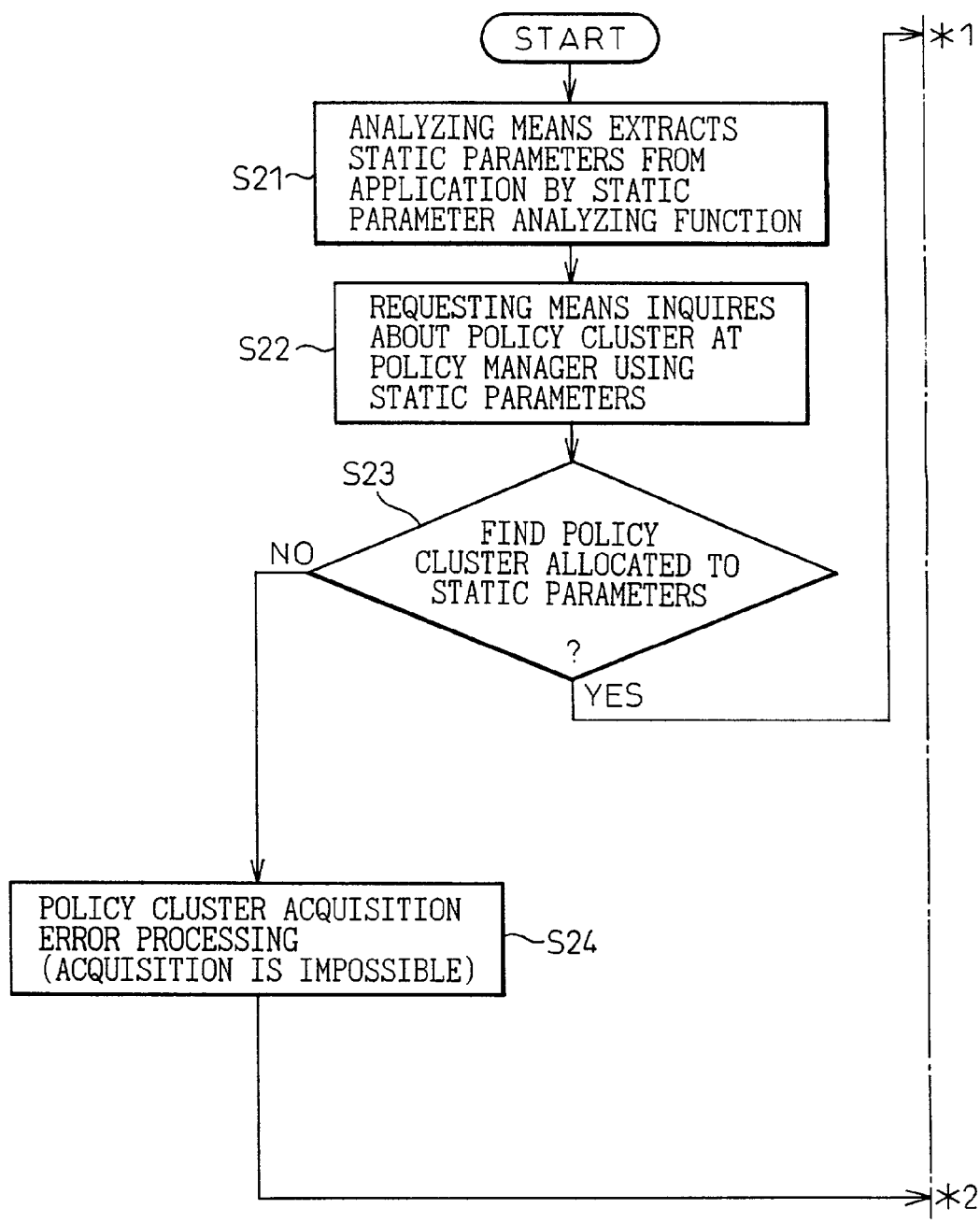
FIG. 8 is a first part of a flow chart showing the processing for acquiring a policy cluster in advance.
Figure 9:
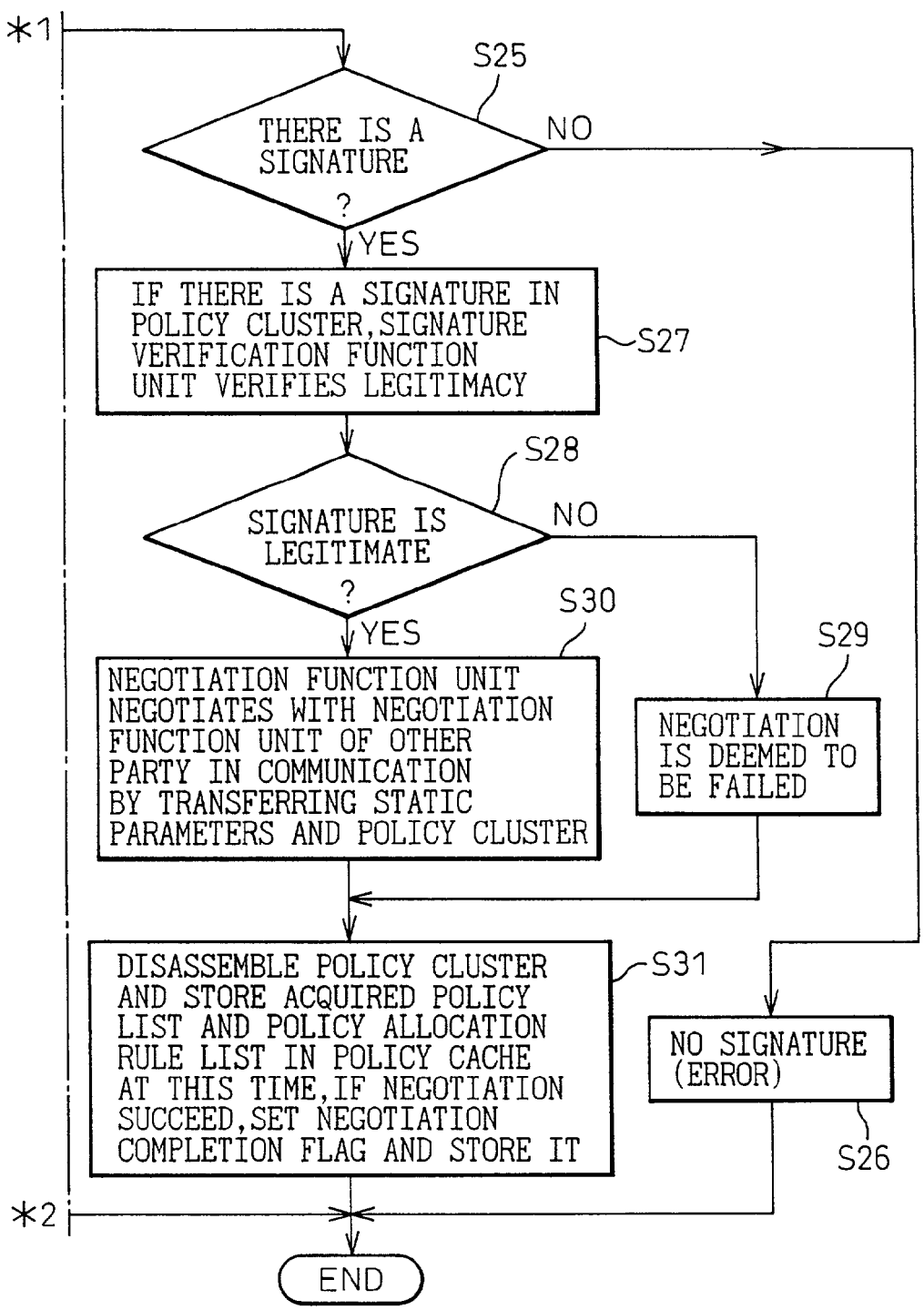
FIG. 9 is a second part of a flow chart showing the processing for acquiring a policy cluster in advance.
Figure 10:
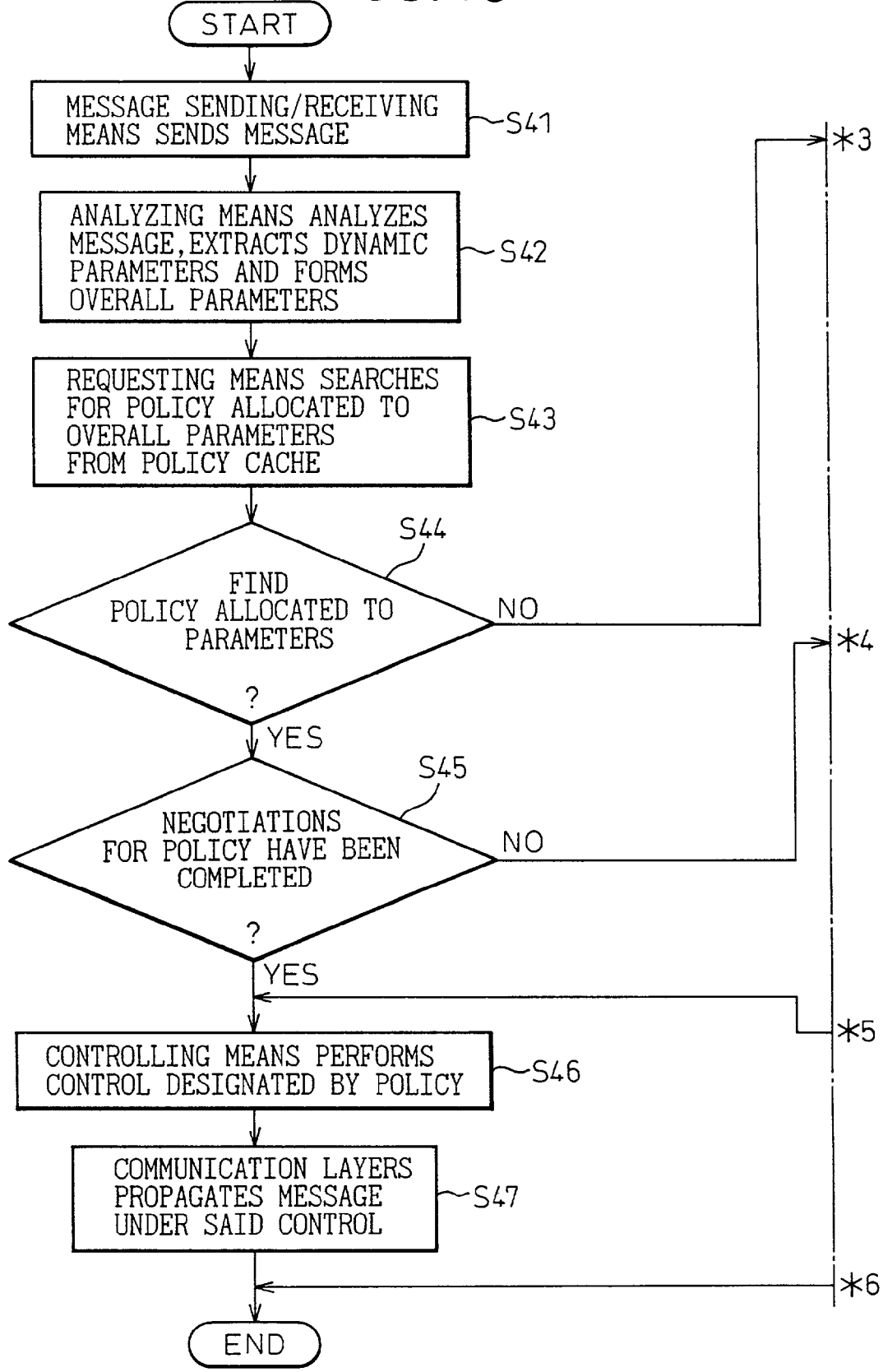
FIG. 10 is a first part of a flow chart showing the processing at the time of message communications.
Figure 11:
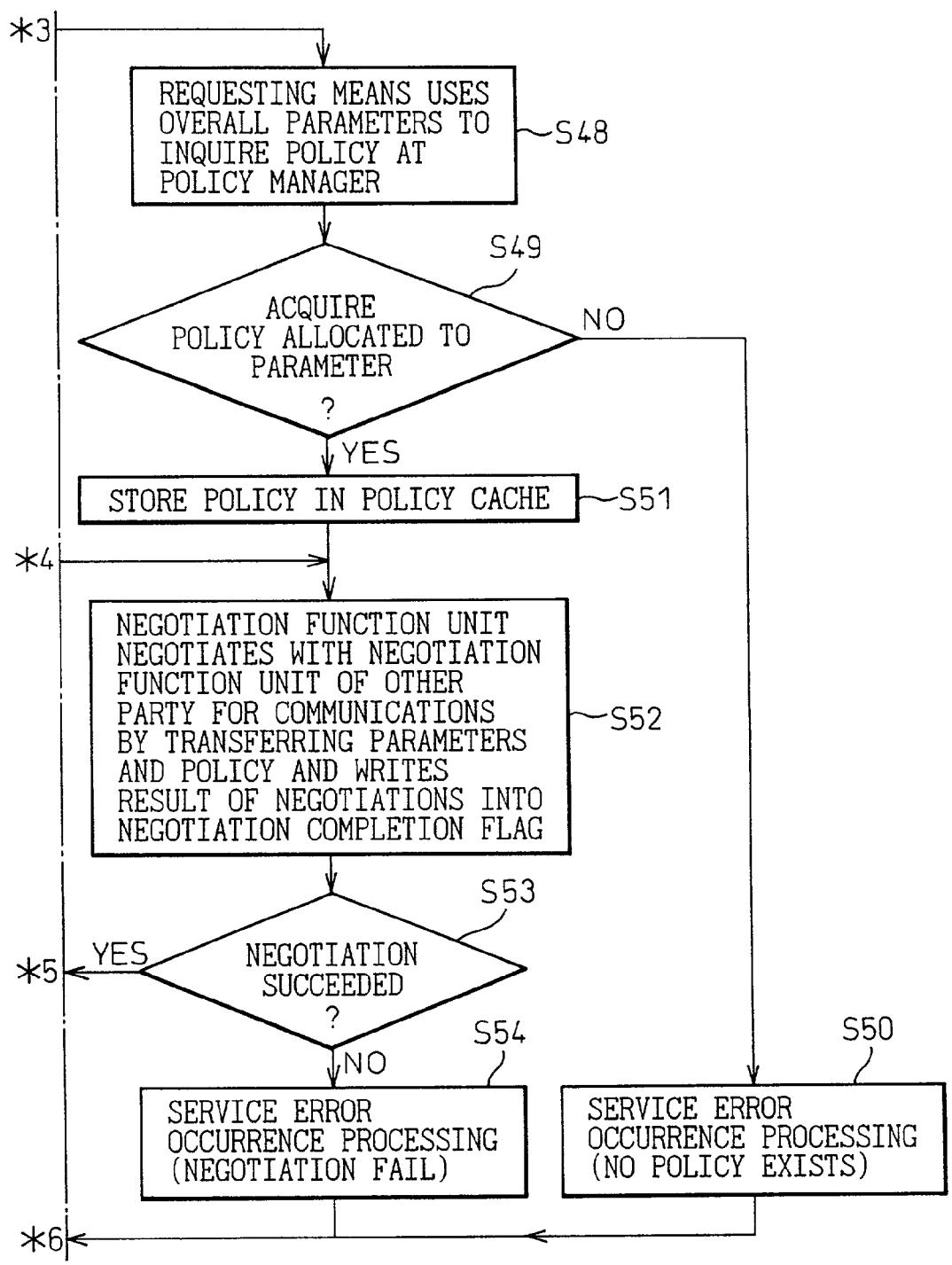
FIG. 11 is a second part of a flow chart showing the processing at the time of message communications.

FIG. 8 and FIG. 9 are parts of a flow chart showing the processing for acquiring a policy cluster in advance. Further, FIG. 10 and FIG. 11 are parts of a flow chart showing processing at the time of message communications.

First, an explanation will be given with reference to FIG. 8 and FIG. 9.

According to the flow chart shown in above-mentioned FIG. 16 and FIG. 17, the service layer 3 starts operating from the time when the message sending/receiving means 10 of the application 1 sends a message. It communicates the message after analyzing the message, acquiring the policy, and executing control by the policy cache and policy.

As opposed to this, the processing according to the present invention is divided into the operation for acquiring the policy cluster in advance and the operation for acquiring a policy at the time of message communications.

[Advance Acquisition of Policy Cluster]

FIG. 8 and FIG. 9 are parts of a flow chart showing an example of the flow of processing when acquiring a policy cluster in advance. Note that the present invention is not particularly limited as to at what occasion the processing for advance acquisition is started, but for example the time when starting up the application 1, the time when the user logs in and starts using the application 1, the time when the first message is sent from the application 1, etc. may be considered as examples of typical occasions for start.

When the processing is started on such an occasion, the service layer 3 extracts static parameters 101 by the static parameter analyzing function unit 37 of the analyzing means 30 (S21). The method by which the static parameter analyzing function unit extracts the static parameters (for example, the host name, user name, etc.) depends on the type of the static parameters used and the type of mounting. For example, inquiring at the hardware, inquiring at the operating system or other software, acquisition from the environmental variables, inquiring at the application, and other methods may be mentioned. The thus obtained static parameters can for example be stored by the analyzing means 30 until the parameters are erased or overwritten by a suitable occasion or means. In this case, after this, the means can automatically link the static parameters and dynamic parameters to form single overall parameters 100 each time dynamic parameters 102 are extracted.

Using the thus obtained static parameters 101, the requesting means 31 uses the policy acquisition function unit 34 to inquire about a suitable policy cluster at the policy manager 7 (S22). The policy manager 7 sends back the policy cluster (FIG. 4 and FIG. 5) including part (or all) of the group of policies corresponding to the static parameters 101. The policy cluster may be generated after receiving an inquiry from the function unit 34, but it is preferable to prepare and hold it in advance. This is particularly the case when using a negotiation completion tag 111 (FIG. 4 and FIG. 5). Note that the generation of a policy cluster will be explained in detail later.

When the service layer 3 obtains a policy cluster (YES at S23), it can verify the signature 114 and negotiate for the policy cluster in a block. At this time, however, it judges if there is a signature 114 in the policy cluster (S25) and then temporarily stores the group of policies of the policy list 113 comprising the policy clusters and the policy allocation rules 112 in the policy cache function unit 35.

The signature 114 is verified by the signature verification function unit 39 of the requesting means 30 (S27). In the case of the above-mentioned RSA computation algorithm, it uses the public key of the issuer (signer) 110 of the policy cluster to confirm that the policy cluster has indeed been prepared by the issuer and, if prepared, if it has been altered. If the signature is illegitimate (NO at S28), error processing for the case of an illegitimate signature is performed (S29).

As an example of this error processing, reporting to the user, recording in a log, stopping the operation of the service layer 3 and application 1, ignoring the signature in the same way as when there is no signature, etc. may be considered.

The block negotiation of the policy cluster is performed by the negotiation function unit 36 of the requesting means 30. If the policy cluster has a negotiation completion tag 111 and that tag 111 is used, the negotiation function unit 36 contacts the negotiation function unit 46 of the service layer 4 of the other party in the communication and confirms if the negotiation completion tag 111 is legitimate or matches etc. If the tag is not legitimate, the entire policy cluster is deemed to have finished being negotiated. On the other hand, if a negotiation completion tag 111 is not used, the negotiation function unit 36 checks all (or part) of the policy allocation rules 112 included in the policy cluster with the negotiation function unit 46 of the service layer 4 of the other party in the communication. If the rules 112 match at both, it is deemed that negotiations have been completed (S30).

Note that while not shown, the requesting means 40 of the other party in communication receiving the negotiations also uses a suitable means to acquire the policy cluster. As the method, it is possible to extract the static parameters by the above method in advance and use the static parameters to acquire a policy cluster from the policy manager 8. Further, the negotiation function units (36, 46) can exchange parts of the parameters to make up for insufficient information.

Next, the requesting means 30 disassembles the policy cluster and stores it in the policy cache function unit 35 (same for requesting means 40 of other party in communications) (S31). That is, it takes out the designated policy in accordance with the individual policy allocation rules 112 and stores it in the cache memory 122 while correctly recording it in the cache table 120 (121).

At this time, when it is deemed that the policy has finished being negotiated, a negotiation completion flag 125 is set in the corresponding allocation rule cache table 120 (FIG. 6 and FIG. 7) (in the example of FIG. 7, the flag 125 is made YES).

[Advance Generation of Policy Cluster and Advance Negotiations]

As already explained, a policy cluster can be generated and negotiated in advance. To generate a policy cluster for a value of a certain static parameter 101, the policy manager 7 pulls out all or part of the group of rules corresponding to the static parameter value from the group of policy allocation rules (not shown) and stores the group of rules and policies which the group of rules allocate in the policy cluster. It is also possible to add auxiliary information (for example, the name of the issuer) or negotiation completion flag to this. If giving a signature, finally the signature is given to the policies and the auxiliary information as a whole.

The negotiation completion flag may be any information and gives a value not contradictory with the other policy manager with which the negotiations have been completed. "Not contradictory" means simply that the values be made the same, but it is desirable to select values which will not allow collisions to easily occur. For example, the method may be mentioned of using a serial number or date at the first half of the negotiation tag and using a random number in the second half to connect the two (see T of FIG. 5).

Further, while the values are different, it is also possible to use a digital signature or other cryptographic technique to give a value which is trustworthy and not able to be forged. Naturally, the method of block negotiation of the policy cluster by the negotiation function units of the service layers 3 and 4 is determined by the method of generation of the policy cluster.

[Time of Message Communications]

FIG. 10 and FIG. 11 show the flow of the processing at the time of message communications in the present invention.

The message sending/receiving means 10 of the application 1 sends the message (S41). When the service layer 3 receives the message, the analyzing means 30 of the service layer 3 uses the dynamic parameter analyzing function unit 38 to analyze the received message and extract the dynamic parameters 102 (S42). For example, in the case of the above-mentioned CORBA, the class name, method name, argument list, etc. to be called up are obtained as dynamic parameters. The dynamic parameters are combined with the already acquired static parameters to form the overall parameters 100 for the received message (S42).

Next, the requesting means 31 uses the overall parameters 100 to successively inquire at the policy cache function unit 35 and policy manager 7 and acquire the policy allocated to that parameter (S43).

When obtaining it from the policy cache function unit 35 (YES at S44), it refers to the allocation rule cache table 120 and confirms if the policy has finished being negotiated (FIG. 7).

On the other hand, when the policy cannot be found in the policy cache function unit 35 (NO at S44) and is acquired from the policy manager 7 (YES at S48 and S49), it is possible to store the acquired policy in the policy cache function unit 35. In this case, it is deemed that the negotiations for that policy have not been completed.

If the acquired policy has not finished being negotiated (NO at S45), the requesting means 31 uses the negotiation function unit 36 to negotiate with the function unit 46 of the other party in the communications (S53). The method of negotiating over a single policy is not particularly limited in the present invention, but for example the methods of negotiation of comparing just the names of the policies or comparing the content of the control indicating the policies may be considered.

Further, regarding the method for determining the result of the negotiations, the method of deeming that the negotiations have not succeeded when the two policies do not match and using one policy based on a certain priority order may be considered. Whatever the case, the result of negotiations is stored as a negotiation completion flag 125 in the policy cache function unit 35. When the negotiations do not succeed (NO in S53), error processing for when any negotiations fail is performed (S54).

On the other hand, when the negotiations have been completed or the negotiations have succeeded (YES of S53), the policy is given to the controlling means 32. The controlling means 35 and 45 of the service layers 3 and 4 involved in the communications perform control designated by the policy (S46). As explained above, the content of the control typically includes verification, encryption, signature, and other security functions. The present invention is not however limited to such security functions.

When this control has ended, the message is propagated through the communication layers 5 and 6 under the suitable control of the controlling means 32 and 42, and the application 2 of the other party in the communications receives this.

In the above explanation, the processing when a policy was not found in the cache function unit 35 or when negotiations were not yet completed for a policy was explained. By suitably acquiring policies all together or conducting block negotiations by policy clusters, cache misshits or encounters with policies not negotiated is reduced to the minimum. Therefore, processing for making inquiries to policy managers 7 or processing for negotiating for each policy can be skipped and fast operation becomes possible.

Summarizing the effects of the invention, according to the present invention, it is possible to eliminate the need as much as possible for processing for inquiring about policies or negotiating with another party in communications for every message communication, which easily occurs in a mode of use where a plurality of different types of messages are communicated in a distributed environment in a short time. Therefore, in such a mode of usage, it becomes possible for a service layer to process at a high speed consecutive message communications.

Further, it is possible for a service layer to detect in advance a mismatch of policies or information relating to the presence of completed advance negotiations of policies due to illegitimate policy managers or human error, communication error, etc. and possible to further enhance the reliability of computer systems.

While the invention has been described with reference to specific embodiments chosen for purpose of illustration, it should be apparent that numerous modifications could be made thereto by those skilled in the art without departing from the basic concept and scope of the invention.

The invention claimed is:

1. A computer system comprising:
   a message sending/receiving means for transferring a series of messages based on an application,
   a service layer for providing a specific additional service to the application in accordance with a policy of specific control or instructions to each message,
   a policy manager for holding and centrally managing various policies and supplying a policy corresponding to a message in accordance with a request for acquisition from the service layer, and
   a communication layer for transferring messages given the service by the service layer in accordance with the policy with the application of the other party, wherein the service layer is provided with
   an analyzing means dividing the parameters described in each message for specifying the message into (i) static parameters not changing over a long period and (ii) dynamic parameters changing over a short period and for extracting said static and dynamic parameters individually from each of said messages, and
   a requesting means for requesting the policy manager to provide a group of policies allocated to the static parameters using the extracted static parameters.

2. A computer system as set forth in claim 1, wherein the policy manager has a response function unit for generating a policy cluster and returning it to the requesting means when receiving a request for acquisition using static parameters from the requesting means, the policy cluster being comprised of at least a group of policies corresponding to overall parameters comprised of the static parameters and various changing dynamic parameters and policy allocation rules indicating the allocations of the group of policies corresponding to the overall parameters.

3. A computer system as set forth in claim 2, wherein
   said requesting means has a policy cache function unit,
   the policy cache function unit temporarily stores in a readable manner the above policy cluster returned from the policy manager, and,
   after the start of the transfer of a message, when a policy cluster allocated to the overall parameters sent is stored in the policy cache function unit, the corresponding policy is acquired from there.

4. A computer system as set forth in claim 3, wherein said requesting means has in the policy cache function unit a negotiation completion flag area for displaying that agreement has been reached when negotiating in advance with the service layer of the other party supporting the application of the other party and reaching agreement on the policy to be used between the two.

5. A computer system as set forth in claim 4, wherein said policy manager stores in said policy cluster a negotiation completion tag for displaying that agreement has been reached when negotiating in advance with the policy manager of the other party supporting the application of the other party and reaching agreement on the policy to be used between the two.

6. A computer system as set forth in claim 2, wherein said policy manager has a signature function unit for generating a signature guaranteeing that the content of the policy cluster is legitimate.

7. A computer system as set forth in claim 5, wherein said requesting means has a negotiation function unit which uses the negotiation completion tag displayed in a policy cluster to confirm the legitimacy of the negotiation completion tag in advance with the service layer of the other party when acquiring a policy cluster from the policy manager and wherein the negotiation function unit negotiates for a plurality of policies included in the policy cluster all together.

8. A computer system as set forth in claim 6, wherein said requesting means has a signature verification function unit for verifying that the signature displayed in the policy cluster is legitimate when acquiring a policy cluster from the policy manager.

9. A service layer for providing a specific additional service in accordance with a policy to a series of messages transferred based on the application while contacting an outside policy manager,
   said service layer comprising:
   an analyzing means for dividing the parameters described in each message for specifying the message into (i) static parameters not changing over a long period and (ii) dynamic parameters changing over a short period and for extracting said static and dynamic parameters individually from each of said messages, and a requesting means for requesting the policy manager to provide a group of policies allocated to the static parameters by using the extracted static parameters.

10. A service layer as set forth in claim 9, further comprising a controlling means for executing an additional service in accordance with a policy.

11. A service layer as set forth in claim 9, wherein said analyzing means is comprised of a static parameter analyzing function unit for extracting static parameters and a dynamic parameter analyzing function unit for extracting dynamic parameters.

12. A service layer as set forth in claim 9, wherein said requesting means has a policy acquisition function unit for acquiring a group of policies allocated from the policy manager to the static parameters using the static parameters described in a message sent to the application of the other party.

13. A service layer as set forth in claim 12, wherein said requesting means has a policy cache function unit for temporarily storing in a readable manner the group of policies acquired from the policy acquisition function unit.

14. A service layer as set forth in claim 13, wherein said requesting means has a negotiation function unit for negotiating for agreement between the two parties regarding the policy to be used with the service layer of the other party supporting the application of the other party for each policy of a group of policies acquired from the policy manager or the policy cache function unit.

15. A service layer as set forth in claim 13, wherein said requesting means has a signature verification function unit for verifying if a signature described for a group of policies acquired from the policy manager or from the policy cache function unit is legitimate.

16. A policy cache function unit provided in a service layer providing a specific additional service in accordance with a policy to a series of messages transferred based on an application while contacting an external policy manager, in each of which messages is described with (i) static parameters not changing over a long period and (ii) dynamic parameters changing over a short period,
    wherein said external policy manager is requested to provide a group of policies allocated to the static parameters, the static parameters being obtained by extracting said static parameters and dynamic parameters individually from each of said messages,
    said policy cache function unit comprising:
    a cache memory for acquiring from the policy manager and temporarily storing one or more policies for specific control or instructions to the messages,
    a policy cache table recording memory addresses in the cache memory storing the policies in correspondence with the policies, and
    an allocation rule cache table for establishing allocation rules of policies for the parameters described in a message so as to specify the message.

17. A policy cache function unit as set forth in claim 16, wherein said allocation rule cache table negotiates in advance with the service layer supporting the application of the other party transferring the message and includes a negotiation completion flag area for displaying that agreement has been reached on the policies recorded in the allocation rule cache table when agreement is reached on the policies to be used between the two.

18. A policy manager for contacting a service layer providing a specific additional service for a series of messages transferred based on an application and supplies to this service layer one or more policies for specific control or instructions to the messages,
    said policy manager having a response function unit for generating a policy cluster and returning it to the service layer when provision of a group of policies is requested by the service layer by static parameters among parameters described in a message for specifying the message,
    said parameters being divided into (i) static parameters not changing over a long period and (ii) dynamic parameters changing over a short period, and the static parameters being obtained by extracting said static and dynamic parameters individually from each of said messages,
    said policy cluster comprised of at least a group of policies corresponding to the overall parameters comprised of static parameters and various changing dynamic parameters and policy allocation rules showing the allocation of each of the group of policies with respect to each of the overall parameters.

19. A policy manager as set forth in claim 18, further comprising an advance negotiation function unit which negotiates in advance with the policy manager of the other party supporting the application of the other party transferring the message and generates a negotiation completion tag for recording the fact of agreement in the policy cluster when the two reach agreement on the policy to be used.

20. A policy manager as set forth in claim 18, further comprising a signature function unit for generating a signature for guaranteeing that the content of the policy cluster is legitimate.

* * * * *